(12) United States Patent
Kim et al.

(10) Patent No.: US 10,887,454 B2
(45) Date of Patent: Jan. 5, 2021

(54) ELECTRONIC APPARATUS AND CONTROL METHOD THEREOF

(71) Applicant: SAMSUNG ELECTRONICS CO., LTD., Suwon-si (KR)

(72) Inventors: Soofeel Kim, Suwon-si (KR); Wonjong Choi, Suwon-si (KR); Jina Ham, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/545,307

(22) Filed: Aug. 20, 2019

(65) Prior Publication Data
US 2020/0059552 A1 Feb. 20, 2020

(30) Foreign Application Priority Data

Aug. 20, 2018 (KR) .................. 10-2018-0096867
Aug. 8, 2019 (KR) .................. 10-2019-0096871

(51) Int. Cl.
*H04M 3/42* (2006.01)
*H04M 1/27453* (2020.01)
*G06N 3/08* (2006.01)

(52) U.S. Cl.
CPC .......... *H04M 3/42025* (2013.01); *G06N 3/08* (2013.01); *H04M 1/27453* (2020.01)

(58) Field of Classification Search
USPC ...... 707/100; 455/412.01, 435.01, 563, 406; 709/206; 715/735; 379/93.01
See application file for complete search history.

(56) References Cited

U.S. PATENT DOCUMENTS

| | | | |
|---|---|---|---|
| 7,415,100 B2 * | 8/2008 | Cooper ................ | H04M 3/527 379/88.01 |
| 9,106,757 B2 | 8/2015 | Kim et al. | |
| 9,191,791 B2 * | 11/2015 | Jung ..................... | H04W 4/12 |
| 9,529,864 B2 | 12/2016 | Sundelin et al. | |
| 2008/0250066 A1 | 10/2008 | Ekstrand et al. | |

(Continued)

FOREIGN PATENT DOCUMENTS

| EP | 3 206 341 | 8/2017 |
|---|---|---|
| KR | 10-0640813 | 10/2006 |

(Continued)

OTHER PUBLICATIONS

PCT Written Opinion of PCT/KR/2019/010547 dated Dec. 18, 2019.

(Continued)

*Primary Examiner* — Maria El-Zoobi
(74) *Attorney, Agent, or Firm* — Nixon & Vanderhye P.C.

(57) ABSTRACT

A method of controlling an electronic apparatus is provided. The method includes obtaining a name referring to a user of another electronic apparatus in a chat with the user of the other electronic apparatus using an artificial intelligence (AI) model trained by an AI algorithm while conducting the chat with the user of the other electronic apparatus using the electronic apparatus; and storing the obtained name in association with contact information of the user of the other electronic apparatus. At least some of the control method of the disclosure may use an AI model trained according to at least one of machine learning, neural network, or deep learning algorithm.

20 Claims, 17 Drawing Sheets

(56) References Cited

U.S. PATENT DOCUMENTS

| | | | |
|---|---|---|---|
| 2009/0070421 A1 | 3/2009 | Samn | |
| 2009/0227375 A1* | 9/2009 | Weisman | A63F 13/332 463/41 |
| 2009/0318119 A1 | 12/2009 | Basir et al. | |
| 2012/0265528 A1 | 10/2012 | Gruber et al. | |
| 2014/0155111 A1* | 6/2014 | Yang | G06F 3/04883 455/466 |
| 2014/0349690 A1* | 11/2014 | Yang | H04W 4/14 455/466 |
| 2015/0161519 A1 | 6/2015 | Zhong et al. | |
| 2015/0215259 A1 | 7/2015 | Pellicer et al. | |
| 2016/0036969 A1* | 2/2016 | Kau | H04M 3/42221 379/85 |
| 2018/0131802 A1* | 5/2018 | Cho | H04M 1/72522 |
| 2018/0246971 A1* | 8/2018 | Dejohn, III | G06F 17/30867 |
| 2019/0347668 A1* | 11/2019 | Williams | H04L 67/2833 |

FOREIGN PATENT DOCUMENTS

| | | |
|---|---|---|
| KR | 10-1728941 | 4/2017 |
| KR | 10-2018-0052112 A | 5/2018 |
| WO | 2014/114172 | 7/2014 |

OTHER PUBLICATIONS

PCT Search Report of PCT/KR2019/010547 dated Dec. 18, 2019.
European Extended Search Report dated Dec. 16, 2019 for EP Application No. 19192507.2.

\* cited by examiner

ELECTRONIC APPARATUS AND CONTROL METHOD THEREOF

CROSS-REFERENCE TO RELATED APPLICATIONS

This application is based on and claims priority under 35 U.S.C. § 119 to Korean Patent Application No. 10-2018-0096867, filed on Aug. 20, 2018, in the Korean Intellectual Property Office, and Korean Patent Application No. 10-2019-0096871, filed on Aug. 8, 2019, in the Korean Intellectual Property Office, the disclosures of which are incorporated by reference herein in their entireties.

BACKGROUND

Field

The disclosure relates to an electronic apparatus and a control method thereof, and for example, to an electronic apparatus capable of obtaining meaningful information in a chat with a counterpart and utilizing the information in various functions and a control method thereof.

The disclosure also relates to an artificial intelligence (AI) system that provides human-level intelligence such as recognition and judgment by utilizing a machine learning algorithm and an application of the AI system.

Description of Related Art

Recently, an artificial intelligence (AI) system that implements human-level intelligence has been used in various fields. Unlike an existing rule-based smart system, the AI system is a system that trains itself autonomously, makes decisions, and becomes increasingly smarter. The more the AI system is used, the more the recognition rate of the AI system may be improved and the AI system may more accurately understand a user preference, and thus, an existing rule-based smart system is being gradually replaced by a deep learning based AI system.

AI technology refers to machine learning (deep learning) and element technologies that utilize the machine learning.

Machine learning may be an algorithm technology that classifies/learns the features of input data autonomously. Element technology may be a technology that simulates functions of human brain such as recognition and judgment by utilizing machine learning algorithm such as deep learning and consists of technical fields such as linguistic understanding, visual comprehension, reasoning/prediction, knowledge representation, and motion control.

AI technology may be applied to various fields as follows. Linguistic understanding may refer to a technology to recognize and apply/process human language/characters and includes natural language processing, machine translation, dialogue systems, query response, speech recognition/synthesis, and the like. Visual comprehension may refer to a technology to recognize and process objects like human vision and includes object recognition, object tracking, image search, human recognition, scene understanding, spatial understanding, image enhancement, and the like. Reasoning prediction may refer to a technology to acquire and logically infer and predict information and includes knowledge/probability based reasoning, optimization prediction, preference based planning, recommendation, and the like. Knowledge representation may refer to a technology to automate human experience information into knowledge data and includes knowledge building (data generation/classification), knowledge management (data utilization), and the like. Motion control may refer to a technology to control autonomous traveling of a vehicle and motion of a robot, and includes motion control (navigation, collision avoidance, and traveling), operation control (behavior control), etc.

Recently, for the efficient management of information and various user experiences, a voice-based AI personal assistant platform has been provided on an electronic apparatus. The electronic apparatus might support a natural and interactive interface to a user through the personal assistant platform.

For example, when the user requests to make a call while referring to a name of a specific counterpart, an AI personal assistant of the electronic apparatus may find a phone number corresponding to the name of the counterpart from previously stored contact information and connect the user with the counterpart. However, in order to use this function, the user must correctly remember the stored name of the counterpart. When the user attempts to contact with a name different from the stored name of the counterpart, there is a problem in that the contact fails.

SUMMARY

Embodiments of the disclosure provide an electronic apparatus capable of obtaining meaningful information in a chat with a counterpart and utilizing the information in various functions and a control method thereof.

According to an example embodiment of the disclosure, a control method of an electronic apparatus includes obtaining a name referring to a user of another electronic apparatus in the chat with the user of the other electronic apparatus using an artificial intelligence (AI) model trained by an AI algorithm while conducting a chat with the user of the other electronic apparatus using the electronic apparatus; and storing the obtained name in association with contact information of the user of the other electronic apparatus.

The control method may further include, based on a user voice for making a call including the obtained name being input, performing a call connection based on the contact information of the user of the other electronic apparatus.

The obtaining may include, based on a first name referring to the user of the other electronic apparatus being previously registered in the contact information of the user of the other electronic apparatus, obtaining a second name different from the first name in the chat with the user of the other electronic apparatus using the AI model.

The control method may further include, based on a user voice for making a call including the second name being input, providing a message a user interface (UI) for inquiring whether to performing a call connection to a counterpart of the first name.

The control method may further include, based on a user input for viewing the contact information of the user of the other electronic apparatus being received, providing a contact information UI including a phone number of the user of the other electronic apparatus, the first name, and the second name.

The control method may further include providing a chat UI for conducting the chat with the user of the other electronic apparatus, wherein the obtaining includes obtaining the name referring to the user of the other electronic apparatus in a chat input through the chat UI using the AI model.

The obtaining may include obtaining the name referring to the user of the other electronic apparatus in a voice chat using the AI model while conducting the voice chat with the user of the other electronic apparatus.

The storing includes, based on the name referring to the user of the other electronic apparatus being obtained more than a predetermined number in the chat with the user of the other electronic apparatus, storing the name in association with the contact information of the user of the other electronic apparatus.

The control method may further include storing a frequency of use of the name referring to the user of the other electronic apparatus in the chat with the user of the other electronic apparatus; and where a same name as the name is stored in association with contact information of another user in addition to the contact information of the user of the other electronic apparatus, based on a user voice for making a call including the name being input, performing a call connection based on contact information of a user of a higher frequency of use of the name.

The control method may further include, based on a user voice including the name for transmitting a message being input, transmitting the message including the name at a beginning based on contact information of the user of the other electronic apparatus.

The control method may further include obtaining schedule information associated with the user of the other electronic apparatus in the chat with the user of the other electronic apparatus using the AI model, and storing the schedule information in association with the contact information of the user of the other electronic apparatus.

The control method may further include, based on a user voice requesting information about a chat counterpart associated with the schedule information being input, providing a reply message UI including the name referring to the user of the other electronic apparatus.

The control method may further include adding a contact record with the user of the other electronic apparatus to a recent contact record, and tagging the name in the contact record with the user of the other electronic apparatus added to the recent contact record.

According to another example embodiment of the disclosure, an electronic apparatus includes a communicator comprising communication circuitry; a memory configured to store computer executable instructions; and a processor configured, by executing the computer executable instructions, to control the electronic apparatus to obtain a name referring to a user of another electronic apparatus in a chat with the user of the other electronic apparatus using an artificial intelligence (AI) model trained by an AI algorithm while conducting a chat with a user of the other electronic apparatus through the communicator, and store the obtained name in association with contact information of the user of the other electronic apparatus in the memory.

The electronic apparatus may further include a microphone, wherein the processor may be further configured to control the electronic apparatus to, based on a user voice for making a call including the obtained name being input through the microphone, perform a call connection based on the contact information of the user of the other electronic apparatus.

The processor may be further configured to control the electronic apparatus to, based on a first name referring to the user of the other electronic apparatus being previously registered in the contact information of the user of the other electronic apparatus, obtain a second name different from the first name in the chat with the user of the other electronic apparatus using the AI model.

The electronic apparatus may further include a display, wherein the processor may be further configured to control the electronic apparatus to, based on a user voice for making a call including the second name being input through the microphone, provide a message user interface (UI) for inquiring whether to performing a call connection to a counterpart of the first name through the display.

The processor may be further configured to control the electronic apparatus to, based on a user input for viewing the contact information of the user of the other electronic apparatus being received, provide a contact information UI including a phone number of the user of the other electronic apparatus, the first name, and the second name.

The electronic apparatus may further include a display, wherein the processor may be further configured to control the electronic apparatus to provide a chat UI for conducting the chat with the user of the other electronic apparatus through the display and obtain the name referring to the user of the other electronic apparatus in a chat input through the chat UI using the AI model.

The electronic apparatus may further include: a microphone, wherein the processor may be further configured to control the electronic apparatus to obtain the name referring to the user of the other electronic apparatus in a voice chat using the AI model while conducting the voice chat with the user of the other electronic apparatus through the microphone.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
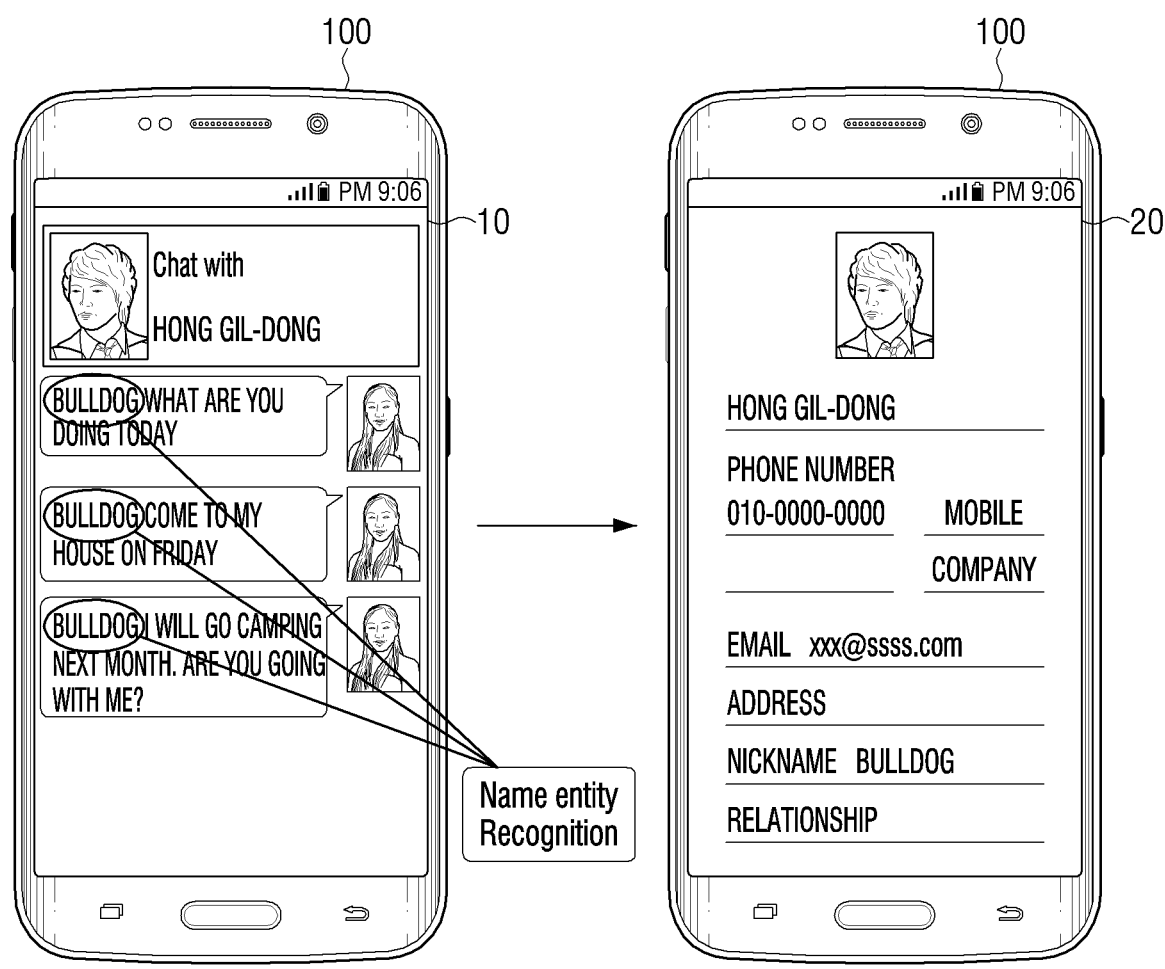
FIG. 1 is a diagram illustrating an electronic apparatus for obtaining meaningful information in a chat with a counterpart according to an embodiment of the disclosure.

The disclosure will now be described in greater detail with reference to the accompanying drawings, in which various example embodiments of the disclosure are illustrated. It should be understood, however, that there is no intent to limit embodiments of the disclosure to the particular forms disclosed, but instead, embodiments of the disclosure are to cover all modifications, equivalents, and alternatives falling within the spirit and scope of the disclosure. Like reference numerals denote like elements in the drawings.

In this disclosure, the expressions "have", "may have", "include" and "comprise", or "may include" and "may comprise" used herein indicate existence of corresponding features (e.g., elements such as numeric values, functions, operations, or components) but do not exclude presence of additional features.

In this disclosure, the expressions "A or B", "at least one of A or/and B", "one or more of A or/and B", and the like may include all combinations of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms such as "first", "second", and the like used herein may refer to various elements regardless of the order and/or priority of the elements and may be used to distinguish an element from another element, not to limit the elements. For example, "a first user device" and "a second user device" may indicate different user devices regardless of the order or priority thereof. For example, without departing the scope of the disclosure, a first element may be referred to as a second element, and similarly, a second element may be referred to as a first element.

The terms, such as "module", "unit", "part", etc. herein should be understood as a unit that processes at least one function or operation and that may be embodied in a hardware manner, a software manner, or a combination of the hardware manner and the software manner. Also, a plurality of "modules", "units", "parts", etc. may be integrated into at least one module or chip and implemented as at least one processor, except that each needs to be implemented in individual specific hardware.

It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present. On the other hand, when an element (e.g., a first element) is referred to as being "directly coupled with/to" or "directly connected to" another element (e.g., a second element), it should be understood that there are no intervening element (e.g., a third element).

According to the situation, the expression "configured to" used herein may be used interchangeable with, for example, the expression "suitable for", "having the capacity to", "designed to", "adapted to", "made to", or "capable of". The term "configured to" does not necessarily refer only to "specifically designed to" in hardware. Instead, the expression "a device configured to" may refer to a situation in which the device is "capable of" operating together with another device or other components. For example, a "processor configured to (or set to) perform A, B, and C" may refer, for example, and without limitation, to a dedicated processor (e.g., an embedded processor) for performing a corresponding operation, a generic-purpose processor (e.g., a central processing unit (CPU) or an application processor), or the like, which performs corresponding operations by executing one or more software programs which are stored in a memory device.

Terms used in this disclosure may be used to describe specific embodiments and may not be intended to limit other embodiments. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary, should also be interpreted as is customary in the relevant related art and not in an idealized or overly formal meaning unless expressly so defined herein in this specification. In some cases, even if terms are terms that are defined in the disclosure, they may not be interpreted to exclude embodiments of this specification.

An electronic apparatus (including a control device and a controlled device) according to various embodiments may include, for example, and without limitation, at least one of smart phones, tablet personal computers (PCs), mobile phones, video phones, electronic book readers, desktop PCs, laptop PCs, netbook computers, workstations, servers, personal digital assistants (PDAs), portable multimedia players (PMPs), MP3 players, mobile medical devices, cameras, wearable devices, or the like. According to various embodiments, the wearable device may include, for example, and without limitation, at least one of an accessory type (e.g., watches, rings, bracelets, anklets, necklaces, glasses, contact lens, or head-mounted-devices (HMDs), a fabric or garment-integrated type (e.g., an electronic apparel), a body-attached type (e.g., a skin pad or tattoos), an implantable type (e.g., an implantable circuit), or the like.

In some embodiments, the electronic apparatus may be a home appliance. The home appliances may include, for example, and without limitation, at least one of televisions (TVs), digital versatile disc (DVD) players, audios, refrigerators, air conditioners, cleaners, ovens, microwave ovens, washing machines, air cleaners, set-top boxes, a home automation control panel, a security control panel, TV boxes (e.g., Samsung HomeSync™, Apple TV™, or Google TV™), game consoles (e.g., Xbox™ and PlayStation™), electronic dictionaries, electronic keys, camcorders, electronic picture frames, or the like.

In another embodiment, the electronic apparatus may, for example, and without limitation, include at least one of medical devices (e.g., various portable medical measurement devices (e.g., a blood glucose monitoring device, a heartbeat measuring device, a blood pressure measuring device, a body temperature measuring device, etc.)), a magnetic resonance angiography (MRA), a magnetic resonance imaging (MRI), a computed tomography (CT), scanners, and ultrasonic devices), navigation devices, global navigation satellite system (GNSS), event data recorders (EDRs), flight data recorders (FDRs), vehicle infotainment devices, electronic equipment for vessels (e.g., navigation systems and gyrocompasses, etc.), avionics, security devices, head units for vehicles, industrial or home robots, automatic teller's machines (ATMs) of financial institutions, points of sales (POSs) of stores, internet of things (e.g., light bulbs, various sensors, electric or gas meters, sprinkler devices, fire alarms, thermostats, street lamps, toasters, exercise equipment, hot water tanks, heaters, boilers, etc.), or the like.

According to an embodiment, the electronic apparatus may, for example, and without limitation, include at least one of parts of furniture or buildings/structures, electronic boards, electronic signature receiving devices, projectors, various measuring instruments (e.g., water meters, electricity meters, gas meters, or radiowave meters, etc.), or the like. In various embodiments, the electronic apparatus may be one of the above-described devices or a combination of one or more thereof. The electronic apparatus according to an embodiment may be a flexible electronic apparatus. In addition, the electronic apparatus according to the embodiment may not be limited to the above-described devices and may include electronic apparatuses that are produced according to the development of technologies.

The disclosure provides an electronic apparatus capable of obtaining meaningful information in a chat with a counterpart and utilizing the information in various functions and a control method thereof. Hereinafter, the disclosure will be described in greater detail with reference to the accompanying drawings.

FIG. 1 is a diagram illustrating an electronic apparatus 100 for obtaining meaningful information in a chat with a counterpart according to an embodiment of the disclosure.

Referring to FIG. 1, a user may perform the chat with a user (the counterpart) of another electronic apparatus using the electronic apparatus 100. For example, the user may use a chat application to conduct the chat. The electronic apparatus 100 may obtain a name referring to the counterpart in the chat with the counterpart. In this example, the name referring to the counterpart in the chat may be identified using an artificial intelligence (AI) model trained by AI algorithm.

Referring to FIG. 1, the electronic apparatus 100 may obtain "bulldog" which is the name referring to the counterpart in the chat with the counterpart.

When the name referring to the chat counterpart is obtained, the electronic apparatus 100 may store the obtained name in association with contact information of the counterpart. For example, as illustrated in FIG. 1, the electronic apparatus 100 may add "bulldog" to a nickname item of a previously stored contact of the counterpart. For example, in addition to a name "Hong Gil-Dong" previously registered in the contact information, another name that may refer to the counterpart may be added to the contact information.

In addition to the name referring to the counterpart, a keyword indicating a relationship with the counterpart, an address of the counterpart, etc., may be obtained from the chat, which may be stored in the contact information of the counterpart.

According to various embodiments of the disclosure, meaningful information obtained in the chat as described above may be utilized. For example, the name "bulldog" obtained in an example described in FIG. 1 may be used to call Hong Gil-Dong by voice. When the electronic apparatus 100 receives a user voice "Call Bulldog", the electronic apparatus 100 may perform a call connection based on the contact information of Hong Gil-Dong. Therefore, even though the user does not remember that the name of the counterpart is stored as "Hong Gil-Dong" in the contact information, the user may make a call to "Bulldog" that the user usually often calls the counterpart.

Figure 2:
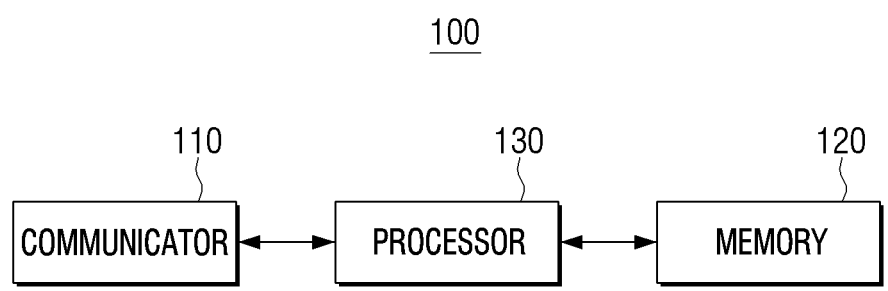
FIG. 2 is a block diagram illustrating an example configuration of an example electronic apparatus according to an embodiment of the disclosure.

FIG. 2 is a block diagram illustrating an example configuration of the electronic apparatus 100 according to an embodiment of the disclosure.

Referring to FIG. 2, the electronic apparatus 100 includes a communicator (e.g., including communication circuitry) 110, a memory 120, and a processor (e.g., including processing circuitry) 130. Some of configurations may be omitted according to implementations, and although not shown, suitable hardware/software configurations that may be apparent to those skilled in the art may be further included in the electronic apparatus 100.

The communicator 110 may include various communication circuitry and be connected to a network through, for example, wireless or wired communication to communicate with an external apparatus. Wireless communication is, for example, a cellular communication protocol and may use at least one of, for example, and without limitation, long-term evolution (LTE), LTE Advance (LTE-A), code division multiple access (CDMA), wideband CDMA (WCDMA), universal mobile telecommunications system (UMTS), Wireless Broadband (WiBro), Global System for Mobile Communications (GSM), etc. In addition, wireless communication may include, for example, and without limitation, short range communication. Short range communication may include, for example, and without limitation, at least one of wireless fidelity direct (WiFi direct), Bluetooth, near field communication (NFC), Zigbee, or the like. Wired communication may include, for example, and without limitation, at least one of universal serial bus (USB), high definition multimedia interface (HDMI), recommended standard232 (RS-232), plain old telephone service (POTS), etc. The network may include a telecommunications network, for example, and without limitation, at least one of a computer network (e.g., LAN or WAN), the Internet, a telephone network, or the like.

The communicator 110 may include various modules including various communication circuitry, such as, for example, and without limitation, a cellular module, a WiFi module, a Bluetooth module, a GNSS module (e.g., a GPS module, a Glonass module, a Beidou module, or a Galileo module), an NFC module, a radio frequency (RF) module, or the like.

The cellular module may provide, for example, a voice call, a video call, a text service, or an Internet service through the telecommunications network. According to an embodiment, the cellular module may perform identification and authentication of an electronic apparatus in the telecommunications network using a subscriber identification module (e.g., a SIM card). According to an embodiment, the cellular module may perform at least some of functions that a processor is capable of providing. According to an embodiment, the cellular module may include a communication processor (CP).

Each of the WiFi module, the Bluetooth module, the GNSS module, and the NFC module may include, for example, a processor for processing data transmitted and received through a corresponding module. According to an embodiment, at least some (e.g., two or more) of the cellular module, the WiFi module, the Bluetooth module, the GNSS module, or the NFC module may be included in one integrated chip (IC) or IC package.

The RF module may transmit and receive, for example, a communication signal (e.g., an RF signal). The RF module may include, for example, a transceiver, a power amp module (PAM), a frequency filter, a low noise amplifier (LNA), an antenna, etc. According to another embodiment, at least one of the cellular module, the WiFi module, the Bluetooth module, the GNSS module, or the NFC module may transmit and receive the RF signal through a separate RF module.

The memory 120 may include, for example, an internal memory and/or an external memory. The internal memory may include at least one of, for example, and without limitation, volatile memory (e.g., dynamic RAM (DRAM), static RAM (SRAM), synchronous dynamic RAM (SDRAM), etc.), non-volatile memory (e.g., one time programmable ROM (OTPROM), programmable ROM (PROM), erasable and programmable ROM (EPROM), electrically erasable and programmable ROM (EEPROM), mask ROM, flash ROM, flash memory (e.g., NAND flash or NOR flash, etc.), a hard drive, a solid state drive (SSD), or the like.

The external memory may include a flash drive, for example, and without limitation, compact flash (CF), secure digital (SD), micro secure digital (Micro-SD), mini secure digital (Mini-SD), extreme digital (xD), a multi-media card (MMC), a memory stick, etc.

The memory 120 may be accessed by the processor 130 and read/write/modify/delete/update data by the processor 130.

In the disclosure, the term "memory" may include at least one of a memory provided separately from the processor 130, a ROM (not shown) or a RAM (not shown) in the processor 130.

The processor 130 may include various processing circuitry for controlling the overall operation of the electronic apparatus 100. For example, the processor 130 may drive an operating system and an application to control a plurality of hardware or software components connected to the processor 130, and may perform various data processing and operations. The processor 130 may include various processing circuitry, such as, for example, and without limitation, a central processing unit (CPU), a graphics-processing unit (GPU), or both. The processor 130 may be implemented as various processing circuitry, such as, for example, and without limitation, at least one general processor, a digital signal processor, an application specific integrated circuit (ASIC), a system on chip (SoC), a microcomputer (MICOM), etc.

The processor 130 may perform various operations using an AI model trained by an AI algorithm. For example, the processor 130 may obtain meaningful information in a chat with a counterpart performed using the electronic apparatus 100 using the AI model trained by the AI algorithm.

The AI model may be a determination model trained based on the AI algorithm, and, for example, may be a model based on a neural network. The trained AI model may be designed to simulate a human brain structure on a computer and may include a plurality of network nodes having weights that simulate neurons in a human neural network. The plurality of network nodes may form a connection relationship such that neurons simulate the synaptic activity of neurons that send and receive signals through synapses. In addition, the trained AI model may include, for example, a neural network model or a deep learning model developed from the neural network model. In the deep learning model, the plurality of network nodes may be located at different depths (or layers) and exchange data according to a convolutional connection relationship. Examples of the trained AI model may include, but are not limited to, a Deep Neural Network (DNN), a Recurrent Neural Network (RNN), a Bidirectional Recurrent Deep Neural Network (BRDNN), etc.

The electronic apparatus 100 may use a personal assistant program (e.g., Bixby™), which is an AI dedicated program (or an AI agent). The personal assistant program may refer, for example, to a dedicated program to provide AI based services. An existing general purpose processor (e.g., s CPU) may be used for AI processing, or a single purpose processor (e.g., a GPU, a FPGA, an ASIC, etc.) may be used. The electronic apparatus 100 may include a plurality of processors, for example, an AI dedicated processor and a processor in charge of other processing.

According to an embodiment of the disclosure, when a predetermined user input (e.g., an icon touch corresponding to a personal assistant chatbot, a user voice including a predetermined word, etc.) is input or a button (a button for executing an AI agent) provided in the electronic apparatus 100 is pressed, the AI agent may operate (or may be executed). The AI agent may be in a standby state before the predetermined user input is detected or the button provided in the electronic apparatus 100 is selected. The standby state may, for example, be a state of detecting that a predefined user input (e.g., when a user voice including a predetermined keyword (e.g., Bixby) is input) is received to control a start of an operation of the AI agent. When the predetermined user input is detected or the button provided in the electronic apparatus 100 is selected while the AI agent is in the standby state, the electronic apparatus 100 may operate the AI agent. When the user voice is received, the AI agent may perform a function of the electronic apparatus 100 based on the voice, and may output a reply when the voice relates to an inquiry.

An AI based operation may be performed in the electronic apparatus 100 or may be performed through an external server. In the former case, for example, the electronic apparatus 100 may obtain meaningful information in the chat with the counterpart using the AI model. In the latter case, for example, the electronic apparatus 100 may transmit the chat with the counterpart to the external server, and the external server may obtain the meaningful information from the chat using the AI model and provide the information to the electronic apparatus 100.

Functions related to AI according to the disclosure may, for example, be performed through a processor and a memory.

The processor may include one or a plurality of processors. The, one or the plurality of processors may, for example, be general purpose processors such as, for example, and without limitation, a CPU, an AP, etc., graphic dedicated processors such as, for example, and without limitation, a GPU, a VPU, etc., and/or AI dedicated processors such as, for example, and without limitation, an NPU.

One or the plurality of processors may perform control to process input data according to a predefined operating rule stored in the memory or the AI model. The predefined operating rule or the AI model may be created through learning.

In this example, creating through learning may refer, for example, to the predefined operating rule or the AI model of a desired characteristic being created by applying a learning algorithm to a plurality of learning data. Such learning may be made in a device itself in which AI according to the disclosure is performed, or may be made through a separate server/system.

The AI model may include a plurality of neural network layers. Each layer may have a plurality of weight values, and an operation of a layer may be performed through an operation result of a previous layer and an operation of the plurality of weights. Examples of neural networks include, for example, and without limitation, Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), Deep Q-Networks, or the like, and the neural network in the disclosure is not limited to the above examples except where specified.

A learning algorithm may refer, for example, to a method of training a predetermined target device (e.g., a robot) using a plurality of learning data such that the predetermined target device may make a decision or make a prediction by itself. Examples of learning algorithms may include, for example, and without limitation, supervised learning, unsupervised learning, semi-supervised learning, reinforcement learning, or the like, and the learning algorithm in the disclosure is not limited to the above examples except where specified.

Figure 3:
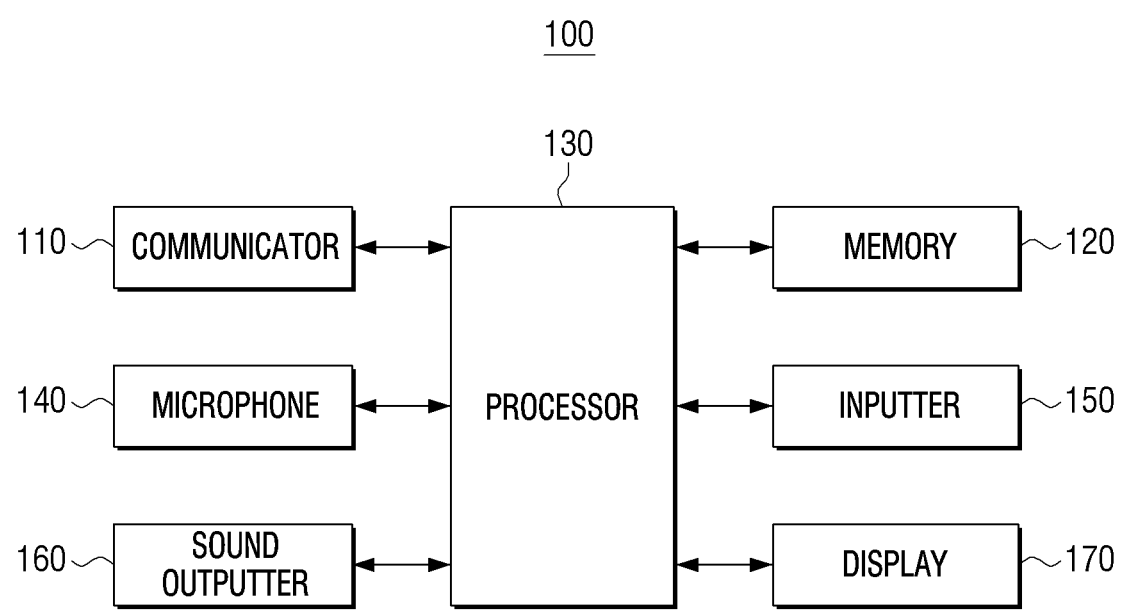
FIG. 3 is a block diagram illustrating an example configuration of an example electronic apparatus according to another embodiment of the disclosure.

FIG. 3 is a block diagram illustrating an example configuration of the electronic apparatus 100 according to another embodiment of the disclosure. As illustrated in FIG. 3, the electronic apparatus 100 may include the communicator (e.g., including communication circuitry) 110, the memory 120, the processor (e.g., including processing circuitry) 130, a microphone 140, an inputter (e.g., including input circuitry) 150, a sound outputter (e.g., including sound output circuitry) 160, and a display 170. Some of configurations may be omitted according to implementations, and although not shown, suitable hardware/software configurations that may be apparent to those skilled in the art may be further included in the electronic apparatus 100. The communicator 110, the memory 120, and the processor 130 are described with reference to FIG. 2, and redundant descriptions thereof may not be repeated here.

The microphone 140 may be a configuration to receive a user voice or other sound and convert it into a digital signal. The processor 130 may obtain meaningful information in a voice chat input through the microphone 140, for example, a name referring to a counterpart, a relationship with the counterpart, an address of the counterpart, etc. The microphone 140 may be provided inside the electronic apparatus 100, but this is only an example and the microphone 140 may be provided outside the electronic apparatus 100 to be electrically connected to the electronic apparatus 100.

The inputter 150 may include various input circuitry and receive a user input and transmit it to the processor 130. The inputter 150 may include, for example, and without limitation, a touch sensor, a (digital) pen sensor, a pressure sensor, a key, a microphone, or the like. The touch sensor, for example, may use at least one of capacitive, resistive, infrared, or ultrasonic methods. The (digital) pen sensor may be, for example, a part of a touch panel or may include a separate recognition sheet. The key may include, for example, a physical button, an optical key, or a keypad.

The sound outputter 160 may include various sound output circuitry and output an audio signal. For example, the sound outputter 160 may output the voice of the counterpart received through the communicator 110. In addition, the sound outputter 160 may output audio data stored in the memory 120. For example, the sound outputter 160 may output various notification sounds and may output voice of an AI assistant. The sound outputter 160 may include, for example, and without limitation, a receiver, a speaker, a buzzer, etc.

The display 170 may be a configuration to output an image. The display 170 may be implemented as, for example, and without limitation, a liquid crystal display (LCD), a light-emitting diode (LED) display, an organic light-emitting diode (OLED) display (e.g., active-matrix organic light-emitting diode (AMOLED), passive-matrix OLED (PMOLED), or a microelectromechanical system (MEMS) display, an electronic paper display, or the like. The display 170 and the touch sensor of the inputter 150 may be implemented as a touch screen by forming a mutual layer structure.

The memory 120 may store computer executable instructions, and when the computer executable instructions are executed by the processor 130, a control method of the electronic apparatus 100 described in the disclosure may be performed.

For example, the processor 130 may execute the computer executable instructions to control the electronic apparatus to obtain a name referring to a user of another electronic apparatus in a chat with the user of the other electronic apparatus using the AI intelligence model trained by the AI algorithm and store the obtained name in the memory 120 in association with contact information of the user of the other electronic apparatus while performing the chat with the user of the other electronic apparatus through the communicator 110.

In addition, the processor 130 may execute the computer executable instructions to control the electronic apparatus to obtain the name referring to the user of the other electronic apparatus in a voice chat using the AI model while the voice chat is performed through the microphone 140.

In addition, when a user voice for making a call including the obtained name is input through the microphone 140, the processor 130 may control the electronic apparatus to perform a call connection based on the contact information of the user of the other electronic apparatus.

In addition, the processor 140 may provide various UIs through the display 170. For example, the processor 140 may provide a UI for a chat, a UI for inquiring whether to perform the call connection, a contact information UI, etc. through the display 170.

Figure 4:
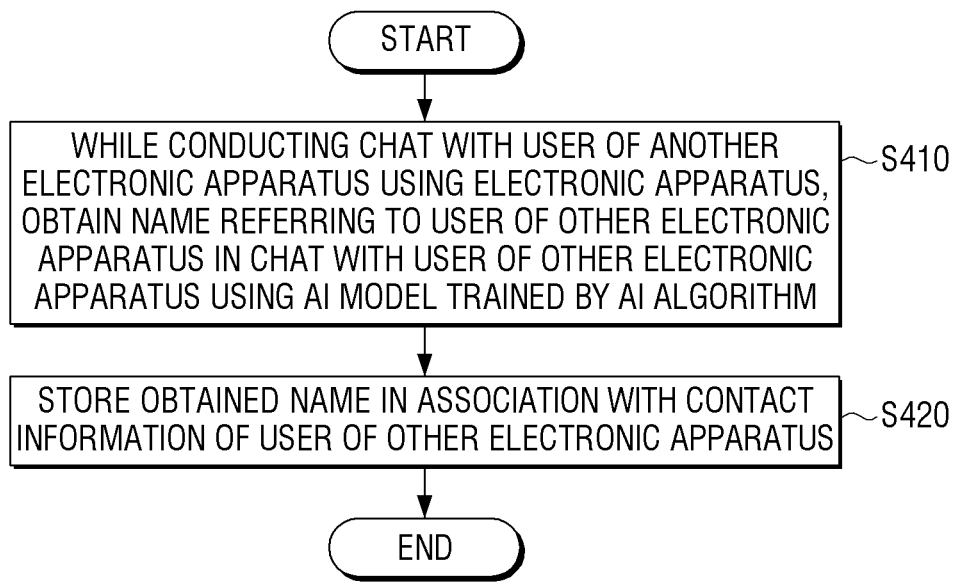
FIG. 4 is a flowchart illustrating an example method of controlling an electronic apparatus according to an embodiment of the disclosure.

FIG. 4 is a flowchart illustrating an example method of controlling the electronic apparatus 100 according to an embodiment of the disclosure.

Referring to FIG. 4, while conducting a chat with a user of another electronic apparatus using the electronic apparatus 100, a name referring to the user of the other electronic apparatus is obtained in the chat with the user of the other electronic apparatus using an AI model trained by an AI algorithm (S410).

In addition to a name referring to a counterpart, various kinds of meaningful information such as a keyword indicating a relationship with the counterpart, an address of the counterpart in the chat, schedule information related to the counterpart in the chat, etc. may be obtained in the chat.

The electronic apparatus 100 may support a text chat function and a voice chat function, and may obtain meaningful information using the AI model in the text chat and the voice chat.

The electronic apparatus 100 may obtain and understand meaningful information in text using the AI model for natural language processing (NLP). When a voice is input, the electronic apparatus 100 may use speech to text (STT) technology that first converts the voice into text. The AI model for analyzing a chat with the counterpart may be provided in the electronic apparatus 100 by itself, or the AI model may be provided in an external server such that the electronic apparatus 100 transmits the chat to the external server and is provided with an analysis result of the chat from the external server. Some processes of chat analysis may be performed in the electronic apparatus 100 and another process may be performed in the external server. For example, the electronic apparatus 100 may transmit the voice chat to the external server, and the external server may convert the voice into text and provide the text to the electronic apparatus 100, and the electronic apparatus 100 may perform NLP on the converted text.

The text chat may be performed through, for example, a message application. The message application may be installed in the electronic apparatus 100 or may include a message application (e.g., KakaoTalk™, Line™, WhatsApp™, etc.) downloaded from an application store such as Google Play™ or Samsung Apps™. The text chat may be in various forms such as, for example, and without limitation, SMS, MMS, email, etc.

The electronic apparatus 100 may provide a chat UI for conducting the chat with the user of the other electronic apparatus. The chat UI may be provided by executing the message application, and may include a region in which a chat text is input and a region on which a chat input by oneself and a chat input by the counterpart are displayed. For example, the electronic apparatus 100 may provide a chat UI 10 as illustrated in FIG. 1.

The electronic apparatus 100 may obtain meaningful information such as a name referring to a user of another electronic apparatus, a relationship, an address, etc. in a chat input through the chat UI using the AI model. For example, the electronic apparatus 100 may obtain "bulldog" which is a name referring to "Hong Gil-Dong" that is a counterpart in the chat input to the chat UI 10 of FIG. 1.

The voice chat may be performed through, for example, and without limitation, a general phone, a Voice over Internet Protocol (VoIP) based Internet phone (e.g., Skype™, FaceTime™, etc.), or the like.

The electronic apparatus 100 may obtain meaningful information such as the name referring to the user of the other electronic apparatus, the relationship, the address, etc. in the voice chat using the AI model while the voice chat is performed with the user of the other electronic apparatus. For example, the electronic apparatus 100 may obtain the name referring to the user of the other electronic apparatus by converting the voice chat into text and inputting the converted text into the AI model, using the AI model.

When a first name is previously registered in contact information of the user of the other electronic apparatus, the electronic apparatus 100 may use the AI model to obtain a second name different from the first name in the chat with the user of the other electronic apparatus. That is, a name different from a previously stored name is obtained. When there is no previously registered name, a new name may be obtained in the chat.

When the name is obtained, the electronic apparatus 100 may store the obtained name in association with the contact information of the user of the other electronic apparatus (420). For example, as described with reference to FIG. 1, a bulldog indicating Hong Gil-Dong in a chat with Hong Gil-Dong may be stored in association with contact information of Hong Gil-Dong. In addition to the name of the counterpart, when a variety of meaningful information such as a keyword indicating the relationship with the counterpart, the address of the counterpart, etc. is obtained in the chat, this may be stored in association with the contact information.

When the name referring to the user of the other electronic apparatus is obtained more than a predetermined number of times in the chat with the user of the other electronic apparatus, the electronic apparatus 100 may store the name in association with the contact information of the user of the other electronic apparatus. For example, it may be determined that the name refers to the counterpart only when the name is used repeatedly more than a predetermined number of times.

When a user input for viewing a contact of the counterpart is received, the electronic apparatus 100 may provide a contact information user interface (UI) including a phone number of the counterpart and names referring to the counterpart. For example, when the user input for viewing the contact of the counterpart is received, the electronic apparatus 100 may provide a contact information UI 20 including the name of the counterpart 'Hong Gil-Dong', a phone number '010-0000-0000', a nickname 'bulldog', etc. as illustrated in FIG. 1.

Functions that may be performed using the name 'Hong Gil-Dong' which is previously registered in the contact information may be performed in the same manner using 'bulldog' which is another name obtained through the chat. According to an embodiment, the name obtained in the chat may be used for a dialing function.

Figure 5:
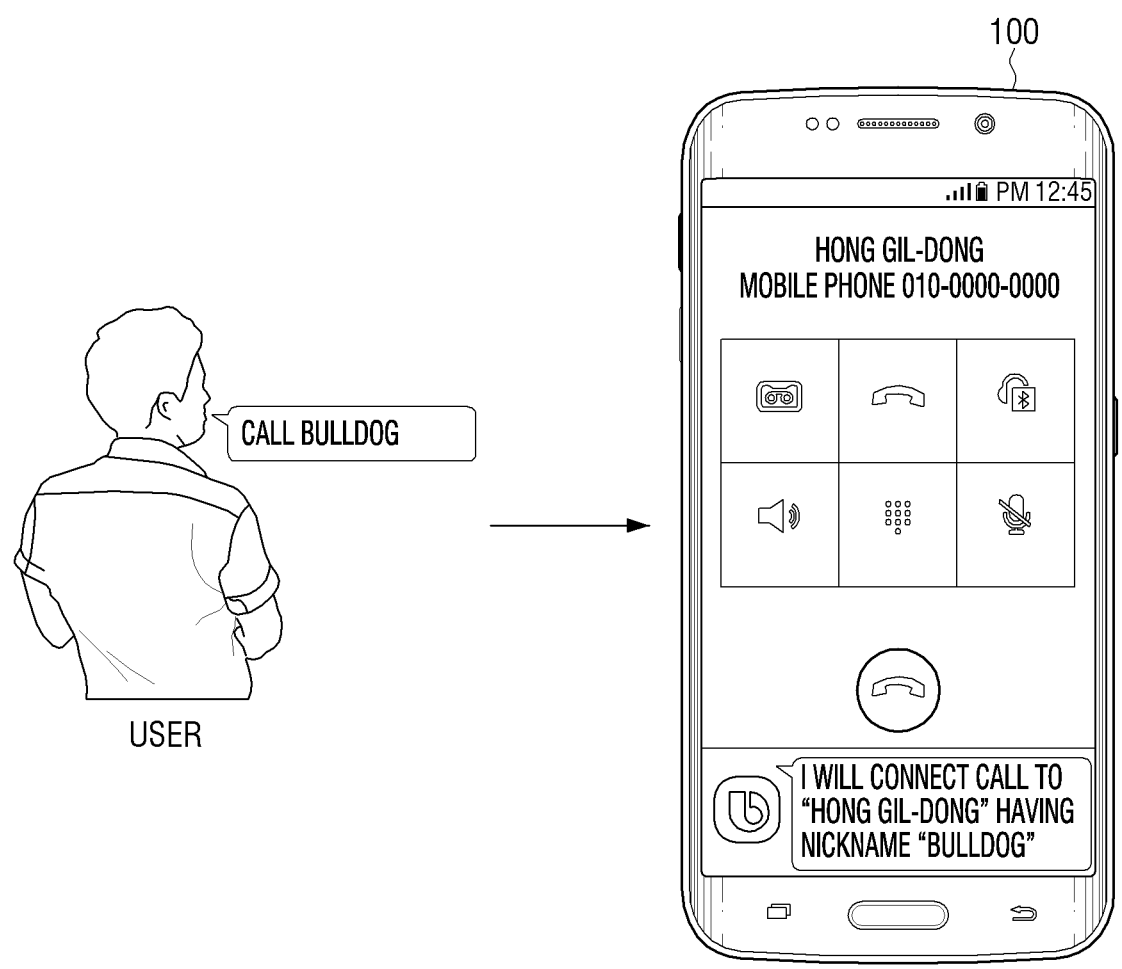
FIG. 5 is a diagram illustrating an example in which a name of a counterpart obtained in a chat is utilized in a dialing function according to an embodiment of the disclosure.

FIG. 5 is a diagram illustrating an example embodiment of the disclosure in which a name of a counterpart obtained in a chat is utilized in a dialing function.

Referring to FIG. 5, when a voice of "Call Bulldog" is input from a user, the electronic apparatus 100 may search for Bulldog in all contact names and nickname items and perform a call connection based on contact information of Hong Gil-Dong having a nickname as the bulldog.

Because an AI assistant of the related art performs a call connection function only based on a stored name, when the voice of "Call Bulldog" is input, the call connection fails, whereas according to an embodiment of the disclosure, the call connection may be successful.

Instead of making a call immediately, the call may be performed after it is confirmed from the user. For example, when a user voice for making a call including the name obtained through the chat is input, the electronic apparatus 100 may provide a message UI inquiring whether to perform the call connection to a previously registered counterpart with another name. An embodiment related to this example will be described in greater detail below with reference to FIG. 6.

Figure 6:
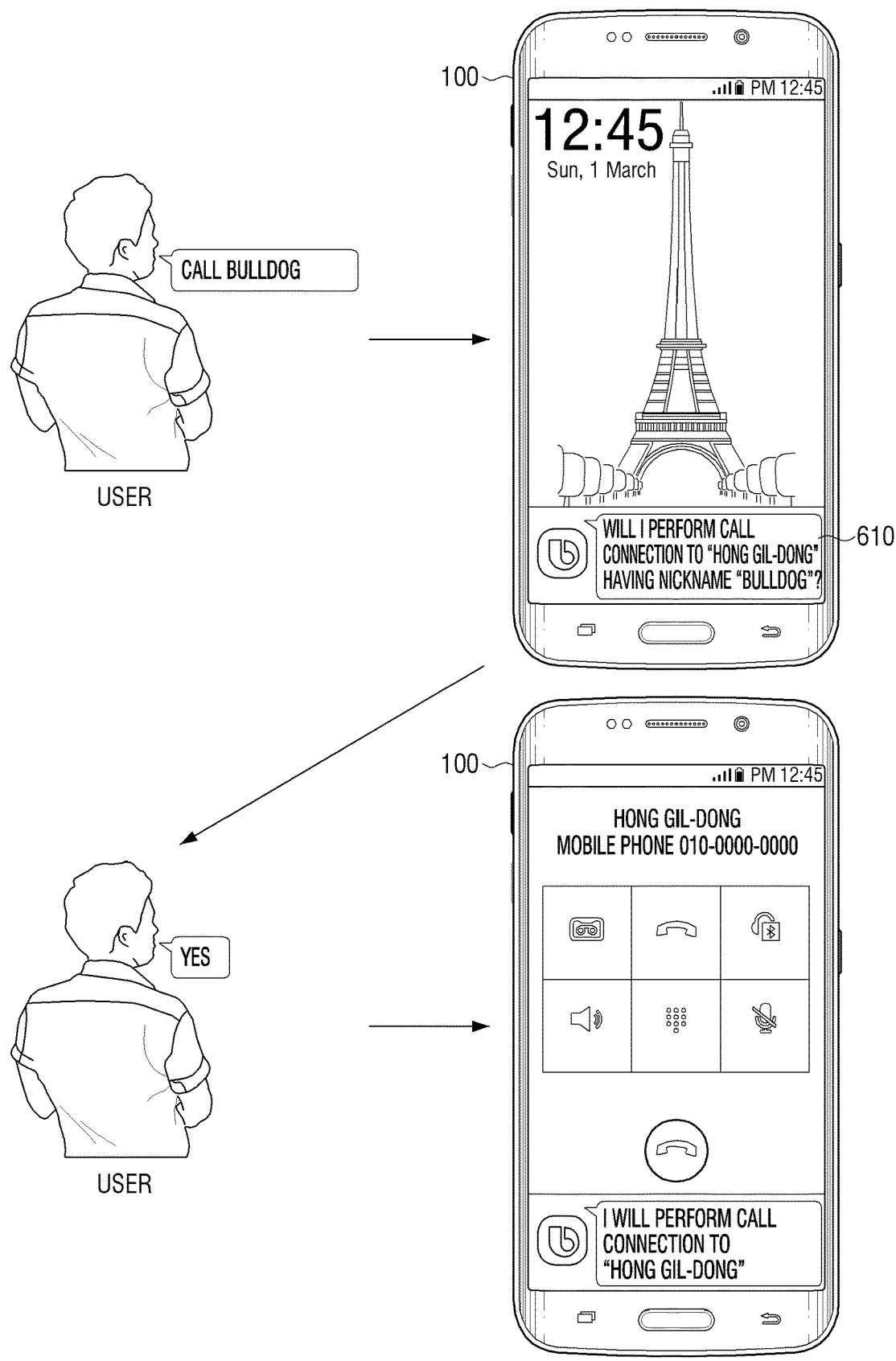
FIG. 6 is a diagram illustrating an example in which a name of a counterpart obtained in a chat is utilized in a dialing function according to another embodiment of the disclosure.

FIG. 6 is a diagram illustrating another example embodiment of the disclosure related to a dialing function.

Referring to FIG. 6, when a voice of "Call Bulldog" is input from a user, an AI assistant of the electronic apparatus 100 may provide a message UI 610 inquiring whether to perform a call connection to another name registered in contact information associated with the bulldog, i.e. "Hong Gil-Dong". When a voice, for example, "yes", that the user agrees with the message UI 610 is input, the electronic apparatus 100 may perform the call connection based on the contact information of Hong Gil-Dong corresponding to the bulldog. When a voice, for example "no", that the user does not agree with the message UI 610 is input, the electronic apparatus 100 may not perform the call connection.

A name referring to a counterpart obtained through a chat may be used in a message sending function in addition to the dialing function. For example, when a voice, "Text Bulldog to meet at the park today" is input from the user, the electronic apparatus 100 may find a contact of Hong Gil-Dong corresponding to Bulldog and transmit a message "Meet at the park today" to the contact.

Figure 7:
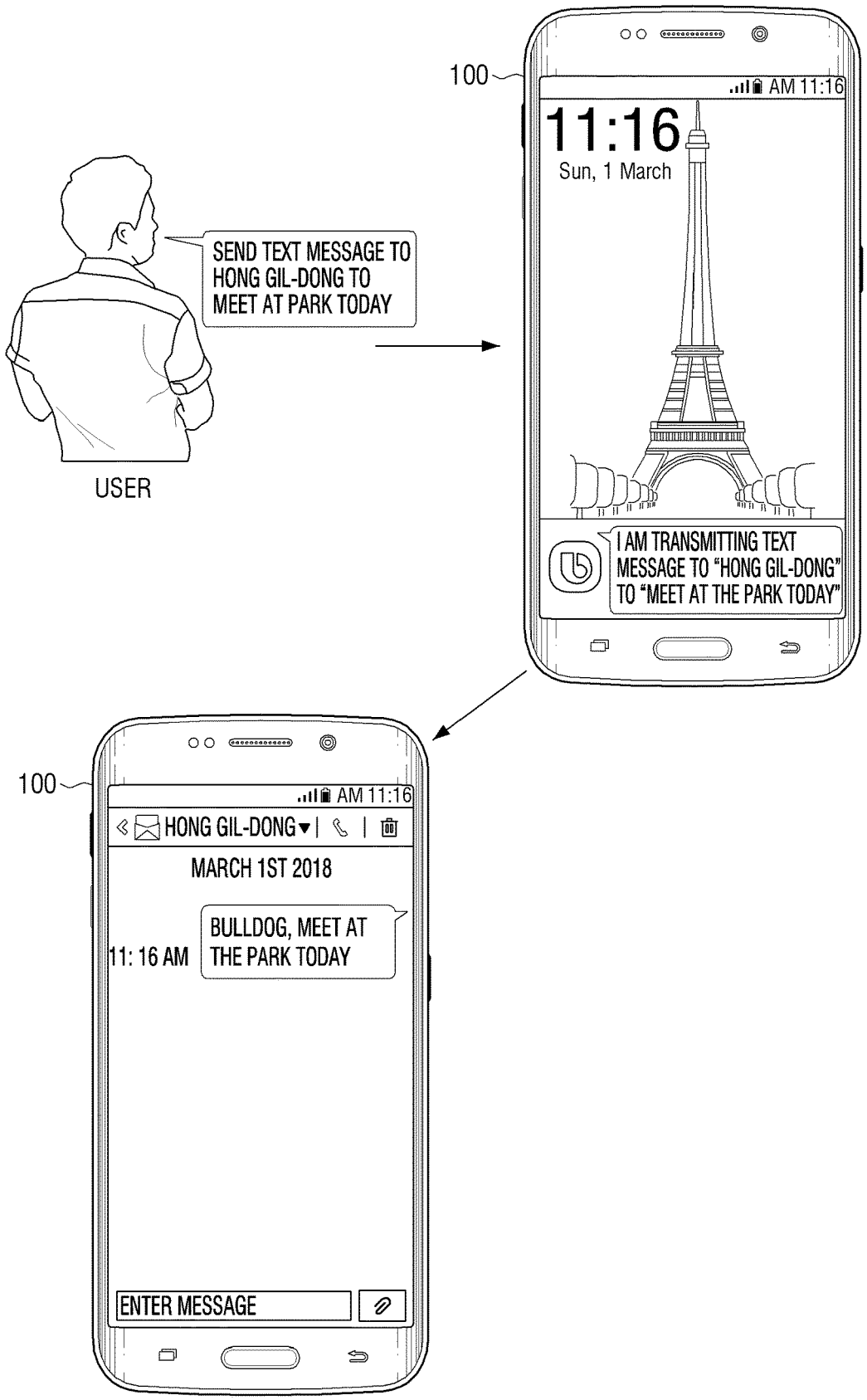
FIG. 7 is a diagram illustrating an example related to a message sending function according to an embodiment of the disclosure.

FIG. 7 is a diagram illustrating another example embodiment of the disclosure related to a message sending function.

The electronic apparatus 100 may transmit a message using a name obtained in a chat with a user of another electronic apparatus. For example, when a user voice including the obtained name for transmitting the message is input, the electronic apparatus 100 may transmit the message including the name in the beginning based on contact information of the user of the other electronic apparatus.

For example, referring to FIG. 7, when a voice "Send text message to Hong Gil-Dong to meet at the park today" is input from a user, because the electronic apparatus 100 has obtained 'bulldog' in a usual chat with Hong Gil-Dong and stored it in contact information of Hong Gil-Dong, the electronic apparatus 100 may transmit a message including 'bulldog', a nickname obtained in a contact of Hong Gil-Dong in the beginning of the message. For example, as illustrated in FIG. 7, the electronic apparatus 100 may transmit the message "Bulldog, meet at the park today". According to the embodiment, there is an advantage in that a message may be transmitted while calling a counterpart by a name commonly used in the usual chat.

The same name may be used to refer to multiple persons. For example, a name stored in association with contact information of a first user of another electronic apparatus and a name stored in association with contact information of a second user of another electronic apparatus may be the same.

Figure 8:
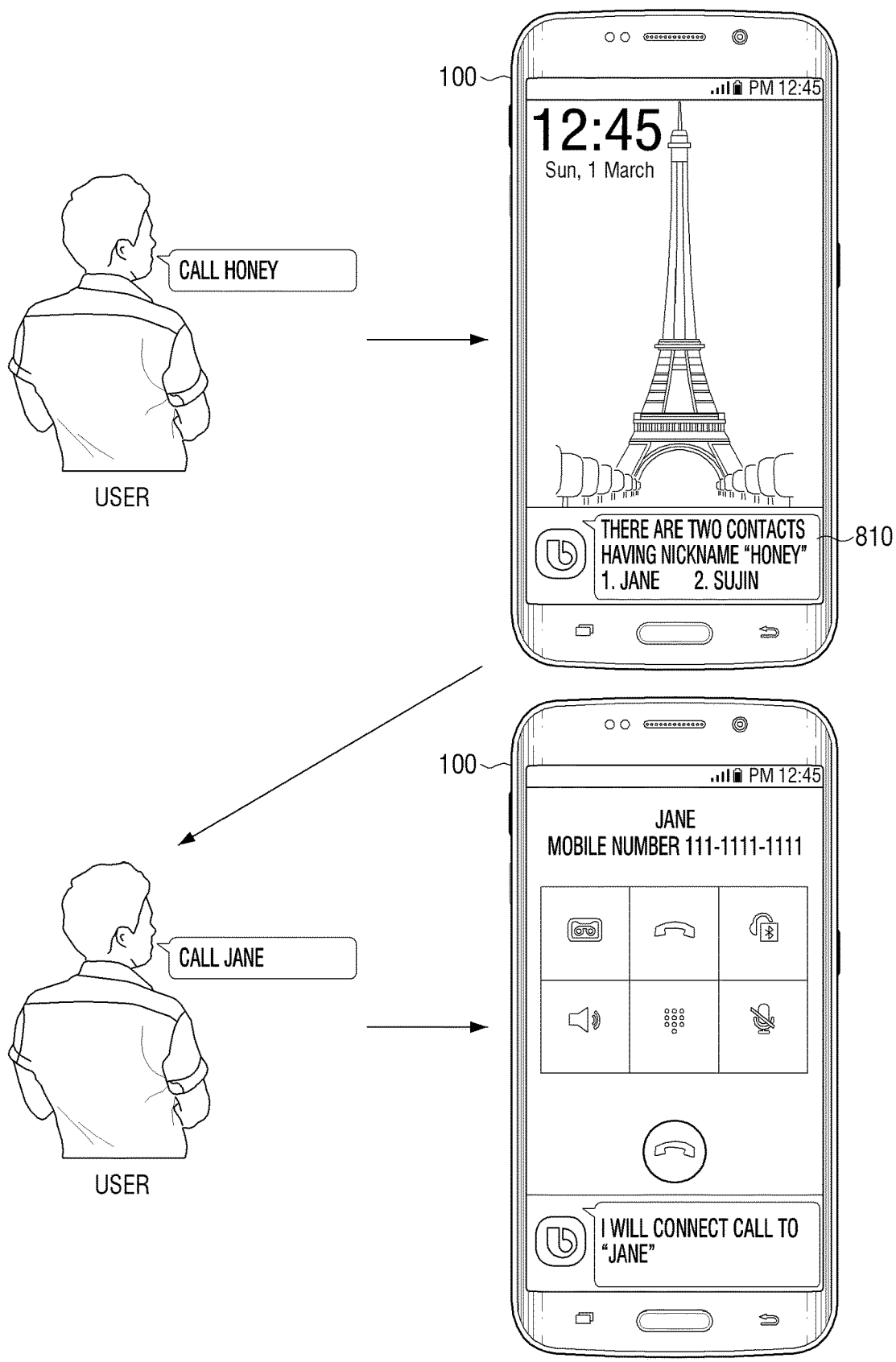
FIG. 8 is a diagram illustrating an example in which a call connection is performed when the same name is used to refer to multiple counterparts according to an embodiment of the disclosure.

FIG. 8 is a diagram illustrating an example embodiment of the disclosure in which a call connection is performed when the same name is used to refer to multiple counterparts.

Referring to FIG. 8, in case where a name "Honey" is stored in association with two pieces of contact information, when a voice "Call Honey" is received from a user, the electronic apparatus 100 may provide a UI 810 indicating that there are a plurality of contacts having "Honey". When the user utters a voice selecting one of the plurality of contacts, for example, "Call Jane", the electronic apparatus 100 may perform the call connection based on a contact of Jane.

According to another embodiment of the disclosure, when the same name is stored in a plurality of contact information, the plurality of contact information may be prioritized and used based on a frequency of use of the name.

For example, the electronic apparatus 100 may store a frequency of use of a name referring to a user of another electronic apparatus in a chat. For example, a frequency of use of a name referring to a first user and a frequency of a use of a name referring to a second user may be stored. When a user voice for making a call including the name is input, the electronic apparatus 100 may perform a call connection based on contact information of a user having a higher frequency of use of the name. An example embodiment in this regard will be described in greater detail below with reference to FIG. 9.

Figure 9:
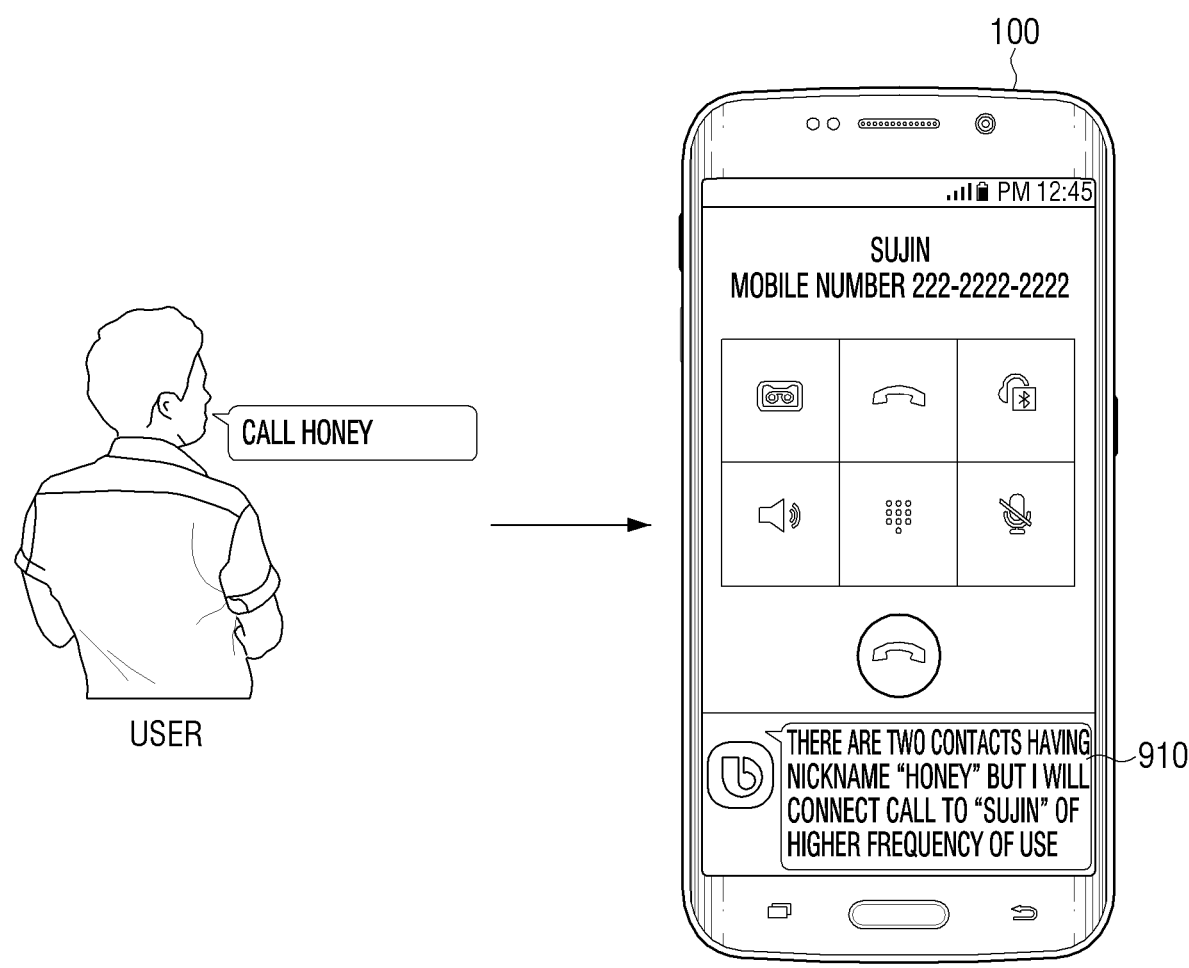
FIG. 9 is a diagram illustrating an example in which a call connection is performed when the same name is used to refer to multiple counterparts according to another embodiment of the disclosure.

Referring to FIG. 9, when a voice of "Call Honey" is received from a user, the electronic apparatus 100 searches for contact information of a person who has "Honey", and when there are a plurality of found contact information, may make a call connection based on contact information of a person with the highest frequency of use of the name "Honey". In this example, a UI 910 may be provided for guiding that the call connection is performed on the contact information of the person with the highest frequency.

On the other hand, because a person may be called by various nicknames, two or more nicknames may be stored in contact information.

Not only a name referring to a counterpart, but also other meaningful information, may be obtained in a chat. For example, information related to an appointment with the counterpart or a schedule may be obtained.

According to an embodiment of the disclosure, the electronic apparatus 100 may obtain schedule information associated with a user of another electronic apparatus in a chat with the user of the other electronic apparatus by using an AI model and store the obtained schedule information in association with contact information of the user of the other electronic apparatus. This embodiment will be described in greater detail below with reference to FIG. 10.

Figure 10:
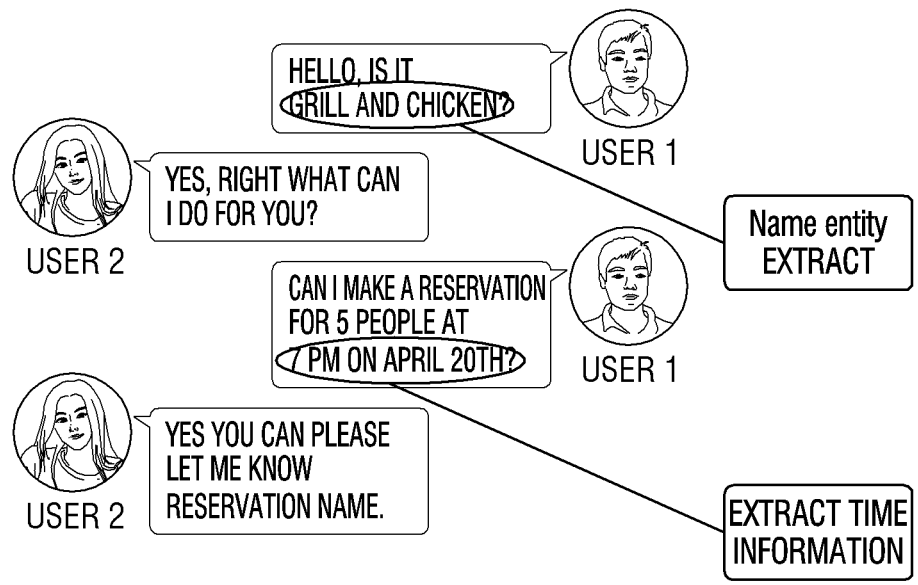
FIG. 10 is a diagram illustrating an example in which schedule information is obtained in a chat according to an embodiment of the disclosure.

FIG. 10 is a diagram illustrating an example embodiment of the disclosure in which schedule information is obtained in a chat.

Referring to FIG. 10, a user (e.g., user 1) of the electronic apparatus 100 performs a voice chat with a user (e.g., user 2) of another electronic apparatus using the electronic apparatus 100. The electronic apparatus 100 may obtain a name referring to the user 2 in the chat, that is, 'grill and chicken', using an AI model, and obtain schedule information (time information). The obtained information may be stored in association with contact information of the user 2 and may be utilized in various functions later.

According to an embodiment of the disclosure, the information obtained in the chat may be stored in association with a time at which the chat takes place. For example, in the case where a voice such as "When did I speak with Bulldog?", "Who was calling at 3?", etc. is input, information about the time at which the chat takes place may be used when an AI assistant replies thereto.

A message application or a phone application that provides a chat service also records time information about when a chat took place, and thus the message application or the phone application may be used. For example, information about recent contact records provided by the phone application may be used.

According to an embodiment, when a chat (text chat or voice chat) is performed with a user of another electronic apparatus using the electronic apparatus 100, a contact record with the user of the other electronic apparatus may be added to the recent contact record. In addition, the contact record added to the recent contact record may be tagged with information (a name referring to a counterpart, schedule information, etc.) obtained from the chat. This embodiment will be described in greater detail below with reference to FIG. 11A.

Figure 11A:
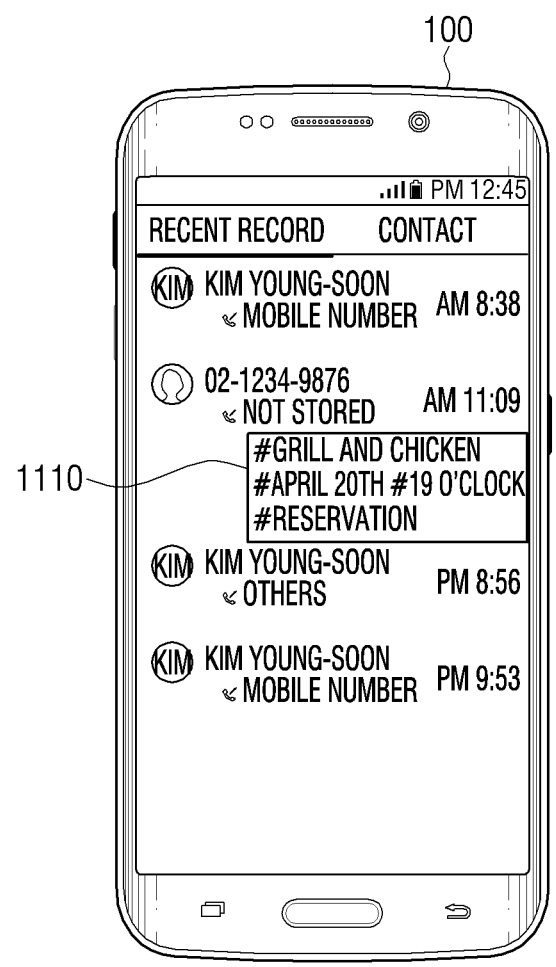
FIG. 11A is a diagram illustrating an example in which a recent contact record is utilized according to an embodiment of the disclosure.

FIG. 11A is a diagram illustrating an example embodiment of the disclosure in which a recent contact record is utilized. FIG. 11A will be described in connection with the chat of FIG. 10.

Referring to FIG. 11A, the electronic apparatus 100 may add time of a chat with the user 2 described in FIG. 10 and a contact of the user 2 to a recent contact record. When the contact of the user 2 is not a previously registered contact, the contact record may be expressed as a phone number (02-1234-9876). Information obtained in a chat, for example, information about a name referring to a counterpart, and schedule information may be added to the added contact record in the form of a tag. For example, as illustrated in FIG. 11A, tag information 1110 may be displayed near the contact record.

According to another embodiment, the information obtained in the chat may be provided to a schedule management application (e.g., a calendar application). For example, information such as 'grill and chicken', '19:00', and 'reservation' may be included in a schedule of Apr. 20, 2018 in the schedule management application.

According to an embodiment of the disclosure, the electronic apparatus 100 may distinguish whether a chat counterpart is a specific person or a store name, in case of the specific person, store information obtained in the chat in contact information, and in case of the store name, store the store name in the recent contact record in the form of a tag. For example, referring to FIG. 1, when the chat counterpart is the person, the electronic apparatus 100 may store the information obtained in the chat in contact information of a contact application and referring to FIG. 11A, when the chat counterpart is the specific store name, the electronic apparatus 100 may store the information obtained in the chat in the recent contact record in the form of a tag.

The schedule information obtained in the chat may be used in various situations. For example, when a user voice requesting information about the chat counterpart associated with the schedule information obtained in the chat is input, the electronic apparatus 100 may provide a reply message UI including a name referring to a user of another electronic apparatus. This will be described in greater detail below with reference to FIGS. 12 to 14.

Figure 12:
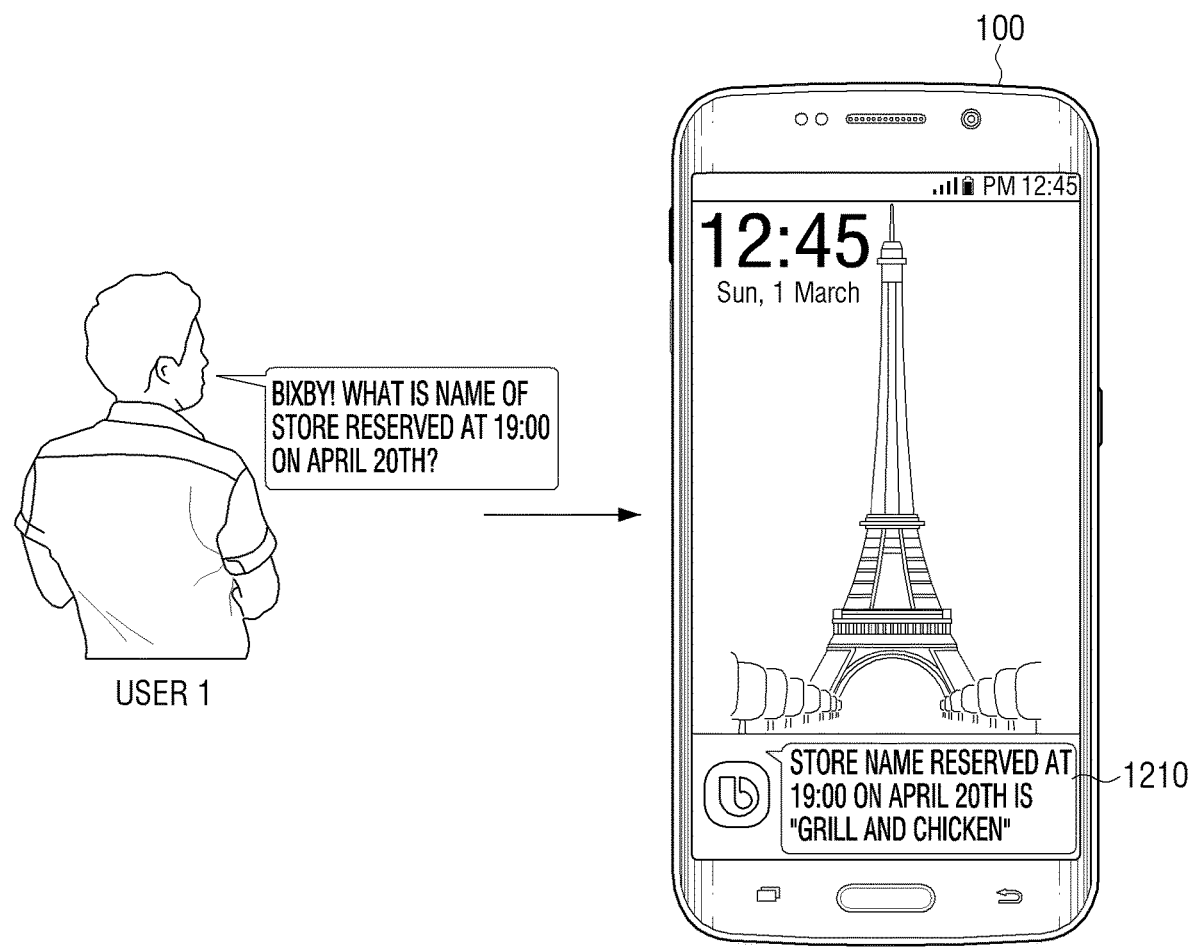
FIG. 12 is a diagram illustrating an example in which schedule information obtained in a chat is utilized according to an embodiment of the disclosure.

FIG. 12 is a diagram illustrating an example embodiment of the disclosure in which schedule information obtained in a chat is utilized. FIG. 12 will be described in connection with the embodiment described with reference to FIG. 11A.

Referring to FIG. 12, when a voice "Bixby, What is the name of the store reserved at 19:00 on April 20?" is received from a user, the electronic apparatus 100 recognizes a trigger keyword "Bixby" to activate an AI assistant, obtain time information from the voice, and search for a store name corresponding to the obtained time information from information tagged in a contact record.

The electronic apparatus 100 may search a recent contact record for a contact record having tagging information including the time information '19:00 on April 20' obtained from the user voice. Referring to FIG. 11A, the electronic apparatus 100 may use a name "Grill and Chicken" referring to a counterpart based on the information tagged in the contact record to provide a response message UI 1210 including "The store name reserved at 19:00 on April 20 is 'Grill and Chicken'".

Figure 13:
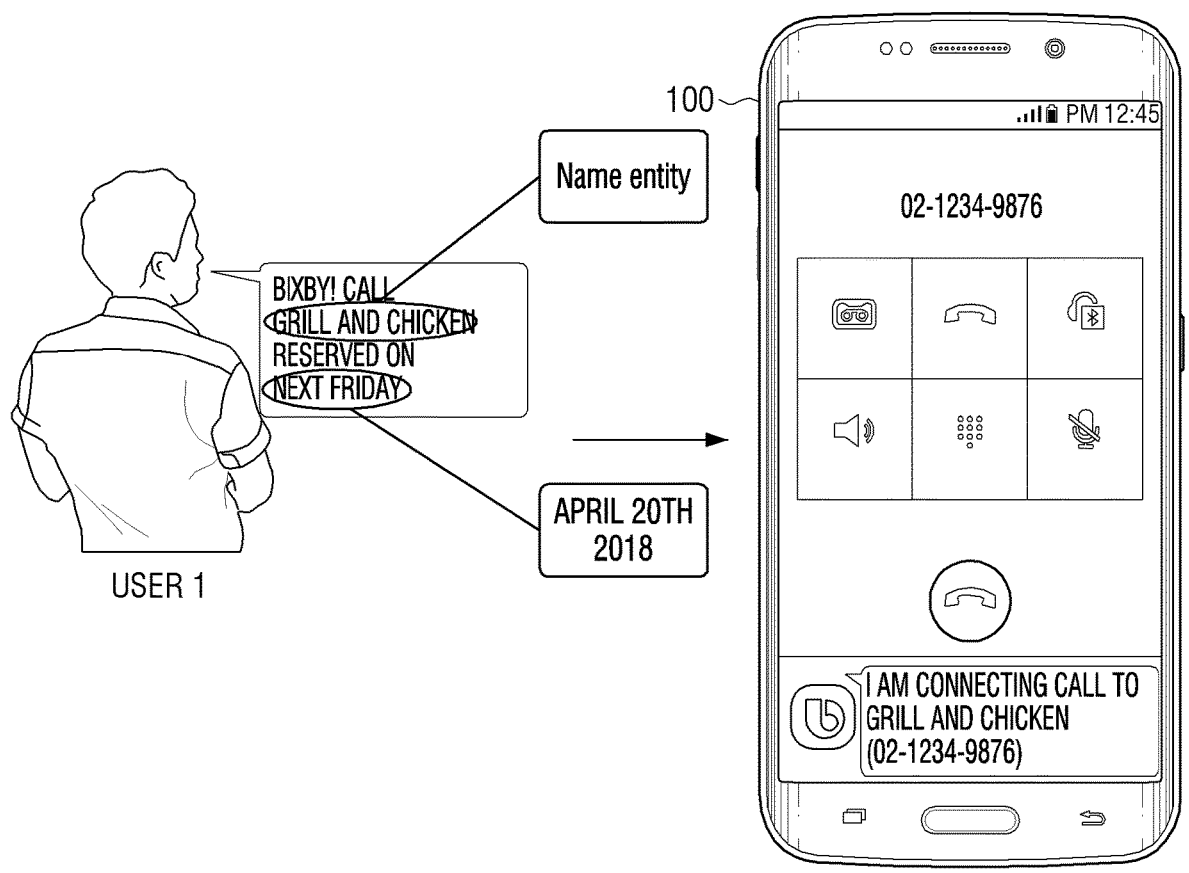
FIG. 13 is a diagram illustrating an example in which schedule information obtained in a chat is utilized according to another embodiment of the disclosure.

FIG. 13 is a diagram illustrating another example embodiment of the disclosure in which schedule information obtained in a chat is utilized. FIG. 13 will be described with reference to the embodiment described in FIG. 11A.

Referring to FIG. 13, when a voice "Bixby! Call Grill and Chicken reserved on next Friday" is received from a user, the electronic apparatus 100 recognizes a trigger keyword "Bixby" to activate an AI assistant, obtain time information and a store name, and search for a phone number corresponding to the obtained time information and store name from a recent contact record.

The electronic apparatus 100 may search the recent contact record for a contact record having 'Apr. 20, 2018' and 'Grill and Chicken' corresponding to the time information 'Next Friday' obtained from the user voice as tagging information. Referring to FIG. 11A, the electronic apparatus 100 may find a contact record "02-1234-9876" having 'Apr. 20, 2018' and 'Grill and Chicken' as the tagging information. In addition, the electronic apparatus 100 may perform a call connection to the contact record "02-1234-9876".

Figure 14:
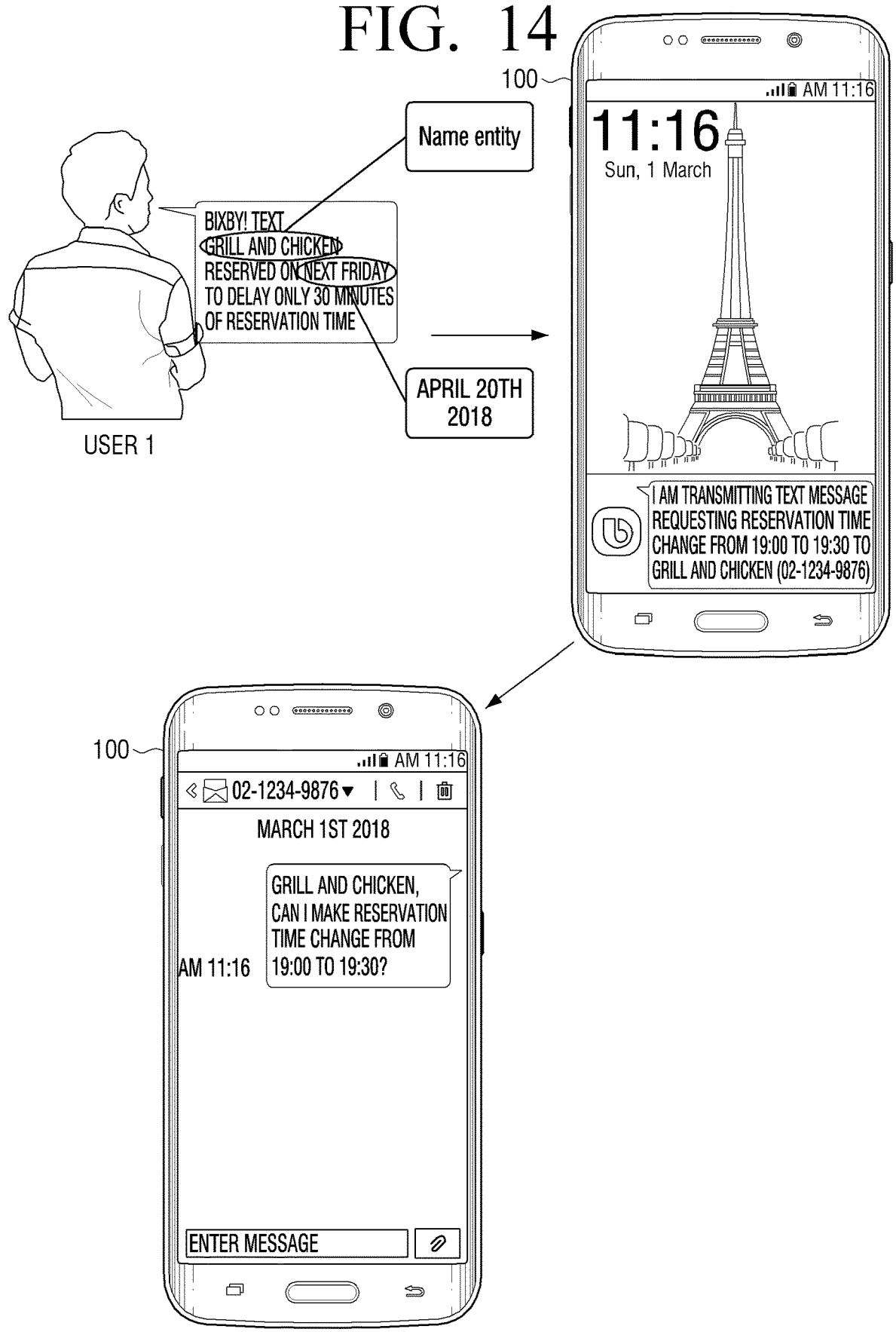
FIG. 14 is a diagram illustrating an example in which schedule information obtained in a chat is utilized according to another embodiment of the disclosure.

FIG. 14 is a diagram illustrating another example embodiment of the disclosure in which schedule information obtained in a chat is utilized. FIG. 14 will be described in connection with the embodiment described in FIG. 11A.

Referring to FIG. 14, when a voice "Bixby! Text Grill and Chicken reserved on next Friday to delay only 30 minutes of a reservation time" is received from a user, the electronic apparatus 100 recognizes a trigger keyword "Bixby" to activate an AI assistant, obtain time information and a store name, and search for a phone number corresponding to the obtained time information and store name from a recent contact record.

The electronic apparatus 100 may search the recent contact record for a contact record having 'Apr. 20, 2018' and 'Grill and Chicken' corresponding to the time information 'Next Friday' obtained from the user voice as tagging information. Referring to FIG. 11A, the electronic apparatus 100 may find a contact record "02-1234-9876" having 'Apr. 20, 2018' and 'Grill and Chicken' as the tagging information. The electronic apparatus 100 may confirm that the reservation time is 19:00 from the information tagged in the contact record, calculate a time that the user wants to change, and transmit a text message requesting a reservation change to "02-1234-9876".

The information tagged in the recent contact record may be deleted together when the contact record is deleted by the user, and may also be automatically deleted together after a retention period of the contact record has passed.

In addition to tagging the information obtained in the chat to the recent contact record, the electronic apparatus 100 may provide the information obtained in the chat to a schedule management application, and a personal assistant may use information in the schedule management application according to a user request to reply to the user.

According to another embodiment of the disclosure, the electronic apparatus 100 may add information obtained in a chat to a contact list. This will be described with reference to FIG. 11B.

Figure 11B:
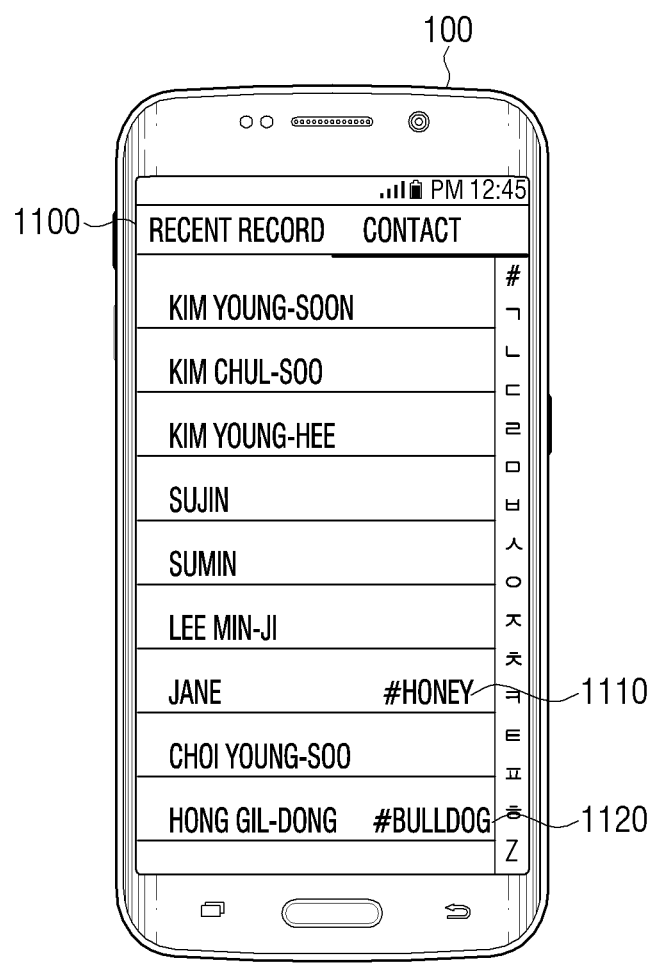
FIG. 11B is a diagram illustrating an example in which information obtained in a chat is added to a contact list according to an embodiment of the disclosure.

FIG. 11B is a diagram illustrating an example contact list UI 1100 provided by the electronic apparatus 100 according to an embodiment of the disclosure.

The electronic apparatus 100 may provide the contact list UI 1100 for contact information stored in the electronic apparatus 100. The contact list UI 1100 may include UI items representing stored contacts. When a UI item is selected, the electronic apparatus 100 may provide a UI including detailed information (a phone number, an email, etc.) of a contact corresponding to the selected UI item.

The electronic apparatus 100 may add information (e.g., a name referring to a counterpart, a keyword indicating a relationship with the counterpart, an address of the counterpart, schedule information related to the counterpart, etc.) obtained from various chat types (e.g., a phone, a text message, a message application, a chat application, an SNS application, etc.) to a contact list. For example, the electronic apparatus 100 may obtain 'Honey', which is a name referring to Jane, in a chat with Jane, obtain 'Bulldog', which is a name referring to Hong Gil-Dong, in a chat with Hong Gil-Dong, and add the obtained information to the contact list. In this case, as shown in FIG. 11B, the electronic apparatus 100 may provide the contact list UI 1100 including 'Honey' 1110 in a UI item of 'Jane' and 'Bulldog' 1120 in a UI item of 'Hong Gil-Dong'.

According to another embodiment of the disclosure, when a contact is searched for in the contact list, the contact may be searched even though a name obtained through a chat is searched for, other than an existing name. For example, referring to FIG. 11B, the contact may be searched by inputting a search term in the contact list UI 1100. In this example, when the contact is searched for using 'Bulldog' as the search term, a contact for Hong Gil-Dong may be provided as a search result.

Figure 15:
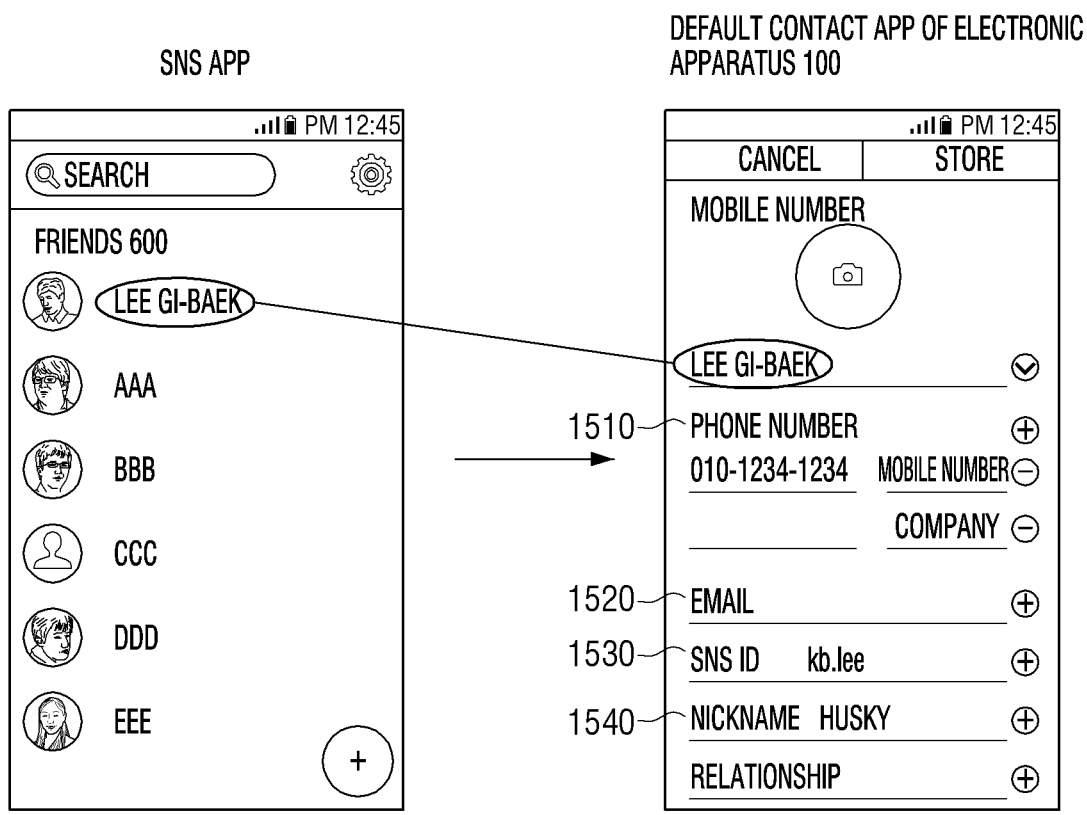
FIG. 15 is a diagram illustrating an example in which a contact is registered in association with a message application according to an embodiment of the disclosure.

FIG. 15 is a diagram illustrating an example embodiment of the disclosure in which a contact is registered in association with an SNS application.

Referring to FIG. 15, the electronic apparatus 100 may search for and register the contact in an address book (or a friend list) of an SNS application (e.g., KakaoTalk™, Facebook™, etc.) but not in a default contact application of the electronic apparatus 100. For example, as illustrated in FIG. 15, a contact for Lee Gi-Baek, which is a person in the friend list of the SNS application but not in the default contact application of the electronic apparatus 100, may be newly registered in the default contact application of the electronic apparatus 100. In this example, items of the contact may be filled in with information provided by the SNS application. For example, a phone number item 1510, an email address item 1520, an SNS ID item 1530, etc. may be filled in based on the information provided by the SNS application.

Meanwhile, not only the contact may be newly registered based on the information provided from the SNS application, but also empty items among items of an existing contact may be filled in. For example, when the contact for Lee Gi-Baek is already registered in the default contact application of the electronic apparatus 100, and an email address item among items constituting the contact for Lee Gi-Baek is empty, the electronic apparatus 100 may receive an email address of Lee Gi-Baek from the SNS application and fill in the email address item.

In addition, the electronic apparatus 100 may obtain information (a name referring to the counterpart, a relationship with the counterpart, a schedule with the counterpart, etc.) related to a counterpart in a chat made through the SNS application, as described above and include the information in contact information. For example, the electronic apparatus 100 may obtain a name 'Husky', which refers to Lee Gi-Baek, in a chat with Lee Gi-Baek made through the SNS application, and fill the obtained name in a nickname item 1540 of a Lee Gi-Baek contact of the default contact application.

In this way, the information added to the contact information may be utilized for various functions such as a dialing function, a message sending function, a reply to a user voice inquiry, etc. as described above.

As described above, according to various embodiments of the disclosure, contact information may be newly registered based on information obtained from various chat types or information obtained from various chat types (e.g., a phone, a text message, a message application, a chat application, an SNS application, etc.) may be stored in association with existing contact information, and may be utilized for various functions.

Figure 16:
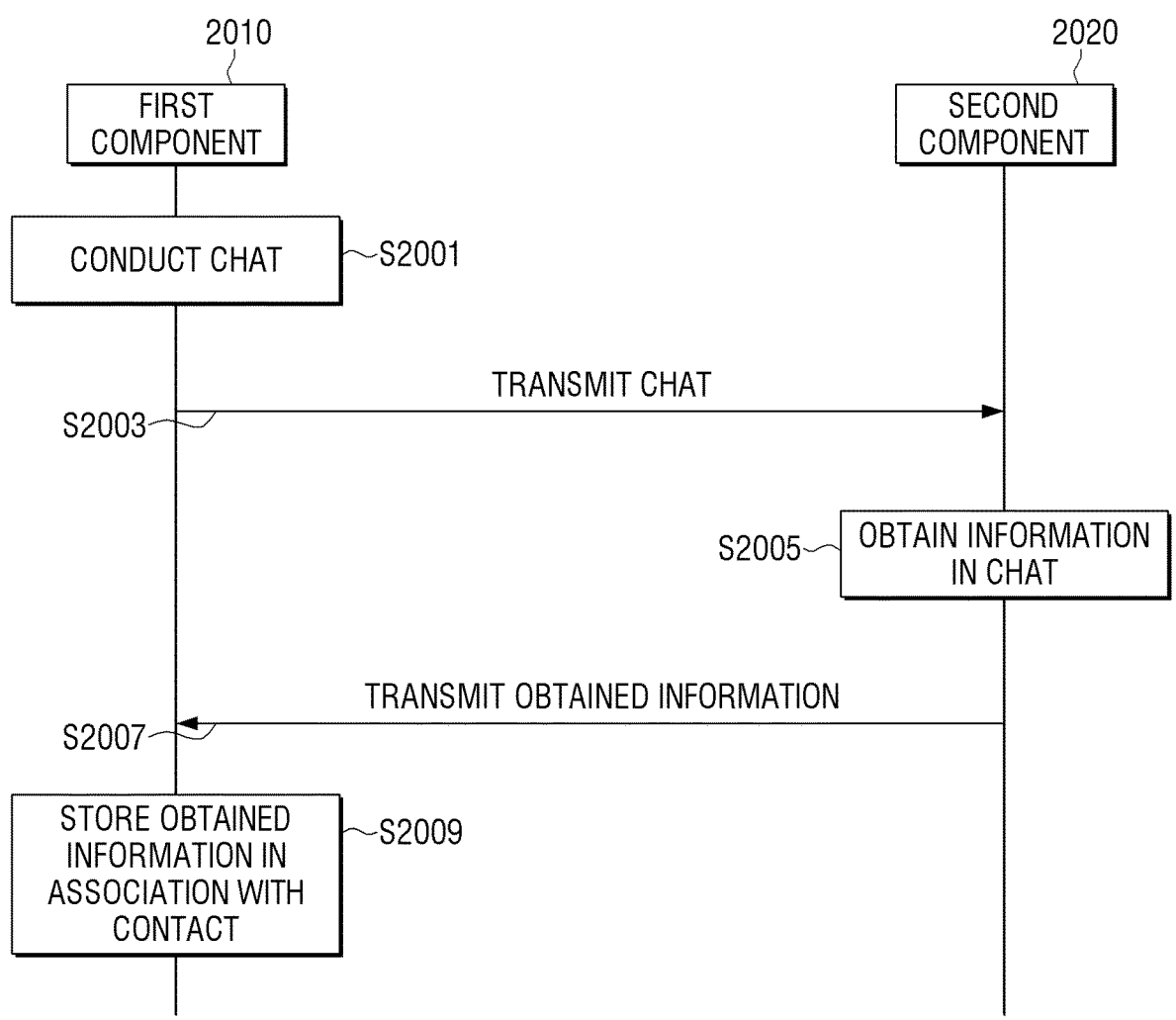
FIG. 16 is a flowchart illustrating an example network system using an AI model, according to various embodiments of the disclosure.

FIG. 16 is a flowchart illustrating an example network system using an AI model, according to various embodiments of the disclosure.

In FIG. 16, the network system using the AI model may include a first component 2010 and a second component 2020.

The first component 2010 may be the electronic apparatus 100. The second component 2020 may be a server in which the AI model is stored. The first component 2010 may be a general purpose processor, and the second component 2020 may be an AI dedicated processor. The first component 2010 may be at least one application, and the second component 2020 may be an operating system (OS). For example, the second component 2020 may be a component that is more integrated, is more dedicated, is less delayed, has greater performance or has more resources than the first component 2010 and may be a component capable of processing more quickly and effectively many operations required when generating, updating or applying a model than the first component 2010.

An interface for transmitting/receiving data between the first component 2010 and the second component 2020 may be provided.

For example, an application program interface (API) having learning data to be applied to the model as a factor value (or, a parameter value or a transfer value) may be provided. The API may include, for example, and without limitation, a set of subroutines or functions that may be called for any processing of another processing (e.g., a protocol defined in an external server of the electronic apparatus 100) in any one protocol (e.g., a protocol defined in the electronic apparatus 100). For example, the API may provide an environment in which an operation of another protocol may be performed in any one protocol.

Referring to FIG. 16, a user may communicate with a counterpart using the first component 2010 (S2001). For example, the first component 2010 may perform a chat through a chat application or a phone as described above.

The first component 2010 may transmit the chat between the user and the counterpart to the second component 2020 (S2003). In case of a text-based chat, the chat text may be transmitted to the second component 2020, and in case of a voice-based chat, audio data including voice may be transmitted to the second component 2020, or the first component 2010 may convert voice into text and transmit the converted text to the second component 2020.

The second component 2020 may, for example, obtain information related to the counterpart in the chat using a trained AI model (S2005). The information related to the counterpart may include information such as, for example, and without limitation, a name referring to the counterpart, a relationship with the counterpart, an address of the counterpart, a schedule with the counterpart, etc. In this regard, the AI model may be a model trained to identify the information related to the counterpart in the chat by using the chat as input data.

The second component 2020 may transmit the information related to the counterpart obtained in the chat to the first component 2010 (S2007).

The first component 2010 may store the information related to the counterpart obtained in the chat in association with contact information of the counterpart (S2009).

In addition, the first component 2010 may utilize the information related to the counterpart stored in association with the contact information in various cases. For example, as in the above-described example, when a voice for requesting a call is input from the user, the first component 2010 may search for contact information corresponding to a name referring to a counterpart included in the voice, and perform a call connection based on the contact information.

According to the embodiments described above, meaningful information may be obtained from a private chat of an individual and utilized for various functions and thus, various user experiences may be possible without being limited to an existing predetermined name, etc. and the private chat of the individual has more information related to the counterpart, and thus the information may be utilized.

Various embodiments described herein may be implemented in software, hardware, or any combination thereof. The embodiments described herein may be implemented in hardware by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electrical units for performing another function. In particular, various embodiments described herein may be implemented by the processor 130 of the electronic apparatus 100. The embodiments regarding procedures or functions may be implemented in software with separate software modules. Each of the software modules enables at least one function or operation described herein.

Various embodiments of the disclosure may be implemented in software that includes instructions that may be stored in machine-readable storage media. Machine is an apparatus capable of calling stored instructions from a storage medium and operating according to the called instructions, and may include a control device 200 of the embodiments.

When the instructions are executed by a processor, the processor may perform a function corresponding to the instructions directly or by using other elements under the control of the processor. The instructions may include code made by a compiler or a code executable by an interpreter. For example, by executing the instructions stored in the storage medium by the processor, the control method of the electronic apparatus 100 described above may be performed. For example, by executing the instructions stored in the storage medium by a processor of a device (or an electronic apparatus), the control method including obtaining a name referring to a user of another electronic apparatus in a chat with the user of the other electronic apparatus using an AI model trained by an AI algorithm and storing the obtained name in association with contact information of the user of the other electronic apparatus while conducting the chat with the user of the other electronic apparatus using the electronic apparatus may be performed.

The machine-readable storage media may be provided in the form of non-transitory storage media. A 'non-transitory' storage media is tangible, but does not distinguish whether data is stored semi-permanently or temporarily on the storage media.

According to an embodiment, the method according to various embodiments herein may be provided in a computer program product. The computer program product may be traded between a seller and a purchaser as a commodity. The computer program product may include a product in the form of a machine-readable storage medium (e.g., compact disc read only memory (CD-ROM)) or may be online distributed through an application store (e.g., Google Play Store™ or AppStore™). In case of electronic distribution, at least a part of the computer program product may be stored or created temporarily on a storage medium such as memory of a server of a manufacturer, a server of an application store, or a relay server.

Each component (for example, a module or a program) according to various embodiments may be composed of a singular entity or a plurality of entities, and some of the above-described subcomponents may be omitted, or other subcomponents may be further included in various embodiments. Alternatively or additionally, some components (e.g., modules or programs) may be integrated into one entity to perform a function performed by each corresponding component prior to integration in the same or similar manner. Operations performed by a module, program, or other component according to various embodiments may be performed sequentially, in parallel, repeatedly, or heuristically, or at least some operations may be performed in a different order, omitted, or another operation may be added.

While various example embodiments have been illustrated and described in the disclosure, the disclosure is not limited to the above-described example embodiments, and may be variously modified by those skilled in the pertinent art without departing from the spirit and scope of the disclosure as, for example, claimed in the claims.

What is claimed is:

1. A method of controlling an electronic apparatus, the method comprising:
    performing a function for communicating with a user of other electronic apparatus;
    obtaining at least one sentence while communicating with the user of the other electronic apparatus;
    obtaining information referring to the user of the other electronic apparatus in the at least one sentence using an artificial intelligence (AI) model; and
    storing the obtained information referring to the user of the other electronic apparatus in association with contact information of the user of the other electronic apparatus;
    wherein the storing comprises storing the name in association with the contact information of the user of the other electronic apparatus based on the name referring to the user of the other electronic apparatus being obtained more than a predetermined number of times in a chat with the user of the other electronic apparatus.

2. The method as claimed in claim 1, further comprising: performing a call connection based on the contact information of the user of the other electronic apparatus based on a user voice for making a call including the obtained name being input.

3. The method as claimed in claim 1, wherein the obtaining includes: obtaining a second name different from a first name in the chat with the user of the other electronic apparatus using the AI model based on the first name referring to the user of the other electronic apparatus being previously registered in the contact information of the user of the other electronic apparatus.

4. The method as claimed in claim 3, further comprising: providing a message user interface (UI) inquiring whether to perform a call connection to a counterpart of the first name based on a user voice for making a call including the second name being input.

5. The method as claimed in claim 3, further comprising: providing a contact information UI including a phone number of the user of the other electronic apparatus, the first name, and the second name based on a user input for viewing the contact information of the user of the other electronic apparatus being received.

6. The method as claimed in claim 1, further comprising: providing a chat UI for conducting the chat with the user of the other electronic apparatus,
wherein the obtaining comprises obtaining the name referring to the user of the other electronic apparatus in a chat input through the chat UI using the AI model.

7. The method as claimed in claim 1, wherein the obtaining comprises obtaining the name referring to the user of the other electronic apparatus in a voice chat using the AI model while conducting the voice chat with the user of the other electronic apparatus.

8. A method of controlling an electronic apparatus, the method comprising:
performing a function for communicating with a user of other electronic apparatus;
obtaining at least one sentence while communicating with the user of the other electronic apparatus;
obtaining information referring to the user of the other electronic apparatus in the at least one sentence using an artificial intelligence (AI) model;
storing the obtained information referring to the user of the other electronic apparatus in association with contact information of the user of the other electronic apparatus;
storing a frequency of use of the name referring to the user of the other electronic apparatus in a chat with the user of the other electronic apparatus; and
where a same name as the name is stored in association with contact information of another user in addition to the contact information of the user of the other electronic apparatus, and performing a call connection based on contact information of a user having a higher frequency of use of the name based on a user voice for making a call including the name being input.

9. The method as claimed in claim 1, further comprising: transmitting a message including a name at a beginning of the message based on the contact information of the user of the other electronic apparatus based on a user voice including the name for transmitting a message being input.

10. The method as claimed in claim 1, further comprising:
obtaining schedule information associated with the user of the other electronic apparatus in the chat with the user of the other electronic apparatus using the AI model; and
storing the schedule information in association with the contact information of the user of the other electronic apparatus.

11. The method as claimed in claim 10, further comprising: providing a reply message UI including the name referring to the user of the other electronic apparatus based on a user voice requesting information about a chat counterpart associated with the schedule information being input.

12. The method as claimed in claim 1, further comprising:
adding a contact record with the user of the other electronic apparatus to a recent contact record; and
tagging the name in the contact record with the user of the other electronic apparatus added to the recent contact record.

13. An electronic apparatus comprising:
a communicator comprising communication circuitry;
a memory configured to store computer executable instructions; and
a processor configured, by computer executable instructions, to control the electronic apparatus to: obtain a name referring to a user of another electronic apparatus in a chat with the user of the other electronic apparatus using an artificial intelligence (AI) model trained by an AI algorithm while conducting the chat with the user of the other electronic apparatus through the communicator, and to store the obtained name in association with contact information of the user of the other electronic apparatus in the memory;
wherein the processor is further configured to store the obtained name in association with the contact information of the user of the other electronic apparatus based on the obtained being obtained more than a predetermined number of times in at least one chat with the user of the other electronic apparatus.

14. The electronic apparatus as claimed in claim 13, further comprising: a microphone,
wherein the processor is further configured to control the electronic apparatus to perform a call connection based on the contact information of the user of the other electronic apparatus based on a user voice for making a call including the obtained name being input through the microphone.

15. The electronic apparatus as claimed in claim 13, wherein the processor is further configured to control the electronic apparatus to obtain a second name different from a first name in the chat with the user of the other electronic apparatus using the AI model based on the first name referring to the user of the other electronic apparatus being previously registered in the contact information of the user of the other electronic apparatus.

16. The electronic apparatus as claimed in claim 15, further comprising: a display and a microphone,
wherein the processor is further configured to control the electronic apparatus to provide a message user interface (UI) inquiring whether to perform a call connection to a counterpart of the first name through the display based on a user voice for making a call including the second name being input through the microphone.

17. The electronic apparatus as claimed in claim 15, wherein the processor is further configured to control the electronic apparatus to provide a contact information UI including a phone number of the user of the other electronic apparatus, the first name, and the second name based on a user input for viewing the contact information of the user of the other electronic apparatus being received.

18. The electronic apparatus as claimed in claim 13, further comprising: a display,
wherein the processor is further configured to control the electronic apparatus to provide a chat UI for conducting the chat with the user of the other electronic apparatus through the display and to obtain the name referring to the user of the other electronic apparatus in a chat input through the chat UI using the AI model.

19. The electronic apparatus as claimed in claim 13, further comprising: a microphone,
wherein the processor is further configured to control the electronic apparatus to obtain the name referring to the user of the other electronic apparatus in a voice chat using the AI model while conducting the voice chat with the user of the other electronic apparatus through the microphone.

20. The method as claimed in claim 8, wherein the storing comprises storing the name in association with the contact information of the user of the other electronic apparatus based on the name referring to the user of the other electronic apparatus being obtained more than a predetermined number of times in the chat with the user of the other electronic apparatus.

* * * * *